United States Patent
Gyobu

(10) Patent No.: US 10,469,550 B2
(45) Date of Patent: Nov. 5, 2019

(54) TRANSMISSION SYSTEM, INFORMATION PROCESSING APPARATUS, COMPUTER PROGRAM PRODUCT, AND METHOD OF INFORMATION PROCESSING

(71) Applicant: RICOH COMPANY, LTD., Tokyo (JP)

(72) Inventor: Yoshikazu Gyobu, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 213 days.

(21) Appl. No.: 15/063,934

(22) Filed: Mar. 8, 2016

(65) Prior Publication Data
US 2016/0266732 A1  Sep. 15, 2016

(30) Foreign Application Priority Data
Mar. 12, 2015 (JP) .................. 2015-049761

(51) Int. Cl.
H04L 29/06 (2006.01)
H04M 3/56 (2006.01)
(Continued)

(52) U.S. Cl.
CPC ........ *H04L 65/403* (2013.01); *H04L 65/1069* (2013.01); *H04L 65/1089* (2013.01);
(Continued)

(58) Field of Classification Search
CPC ............... G06F 3/0481; H04L 65/1069; H04L 65/1089; H04L 65/4015; H04M 3/567;
(Continued)

(56) References Cited

U.S. PATENT DOCUMENTS 6,573,926 B1 * 6/2003 Ichimura .................. H04N 7/15
348/14.08
6,760,749 B1   7/2004 Dunlap et al.
(Continued)

FOREIGN PATENT DOCUMENTS

JP   2002369166 A  * 12/2002
JP   2006-011786       1/2006
(Continued)

OTHER PUBLICATIONS

Extended European Search Report dated Aug. 4, 2016 in European Patent Application No. 16159662.2.

*Primary Examiner* — Thomas J Dailey
*Assistant Examiner* — Lam H Duong
(74) *Attorney, Agent, or Firm* — Xsensus LLP

(57) ABSTRACT

A transmission system includes a first information processing apparatus and a second information processing apparatus. The first information processing apparatus includes: a material transmitter that uploads material data to a third information processing apparatus; an operation acquiring unit that acquires an operation by a user and outputs operation information indicating the acquired operation; and a transmission side controller that causes a transmission side display unit to display the material data and changes how the material data is displayed in accordance with the operation by the user. The second information processing apparatus includes: a material receiver that downloads the material data from the third information processing apparatus; and a reception side controller that causes a reception side display unit to display the downloaded material data and changes how the material data is displayed in accordance with the operation information acquired by the first information processing apparatus.

17 Claims, 16 Drawing Sheets

(51) Int. Cl.
*H04M 7/00* (2006.01)
*H04N 7/15* (2006.01)

(52) U.S. Cl.
CPC ........ *H04L 65/4015* (2013.01); *H04L 65/601* (2013.01); *H04M 3/567* (2013.01); *H04M 7/0027* (2013.01); *H04N 7/15* (2013.01); *H04M 2201/22* (2013.01); *H04M 2203/554* (2013.01)

(58) Field of Classification Search
CPC ........... H04M 7/0027; H04M 2201/22; H04M 2203/554; H04N 7/15
USPC ........................................................ 709/204
See application file for complete search history.

(56) References Cited

U.S. PATENT DOCUMENTS

| | | | | |
|---|---|---|---|---|
| 2005/0262201 A1* | 11/2005 | Rudolph | ............. | H04L 12/1827 709/205 |
| 2006/0041686 A1* | 2/2006 | Caspi | .................... | G06Q 10/10 709/248 |
| 2008/0005233 A1* | 1/2008 | Cai | .................. | H04L 29/06027 709/204 |
| 2010/0023876 A1* | 1/2010 | Shuf | ................... | H04L 12/1827 715/753 |
| 2010/0278453 A1* | 11/2010 | King | ...................... | G06Q 10/10 382/321 |
| 2013/0031174 A1* | 1/2013 | Baba | ..................... | G06F 9/5033 709/204 |
| 2013/0073965 A1* | 3/2013 | Sik | ........................ | G06F 17/241 715/730 |
| 2014/0074932 A1* | 3/2014 | Mihara | ................... | H04L 67/06 709/204 |
| 2014/0122599 A1* | 5/2014 | Park | .................... | H04L 12/1818 709/204 |
| 2014/0244579 A1* | 8/2014 | Bhogal | ................ | G06F 16/954 707/623 |
| 2014/0244740 A1 | 8/2014 | Bhogal et al. | | |
| 2014/0258869 A1* | 9/2014 | Thomas | ................ | G06Q 10/10 715/731 |
| 2015/0058397 A1* | 2/2015 | Kanaya | .............. | H04L 67/2823 709/202 |

FOREIGN PATENT DOCUMENTS

| | | |
|---|---|---|
| JP | 2010-256989 | 11/2010 |
| JP | 2014-056454 | 3/2014 |

* cited by examiner

TRANSMISSION SYSTEM, INFORMATION PROCESSING APPARATUS, COMPUTER PROGRAM PRODUCT, AND METHOD OF INFORMATION PROCESSING

CROSS-REFERENCE TO RELATED APPLICATIONS

The present application claims priority to and incorporates by reference the entire contents of Japanese Patent Application No. 2015-049761 filed in Japan on Mar. 12, 2015.

BACKGROUND OF THE INVENTION

1. Field of the Invention

The present invention relates to a transmission system, an information processing apparatus, a computer program product, and a method of information processing.

2. Description of the Related Art

Conference systems that perform remote conferences with remote places via the Internet or the like have been spreading. This conference system collects, in one conference room in which one part of participants who have a remote conference are present, images and voices of the participants using a communication apparatus and transmits digital data thereof to a communication apparatus of a conference room in which the other part of the participants are present. The communication apparatus of the conference room in which the other part of the participants are present displays images on a display and outputs voices by a speaker, whereby communication is established.

In recent years, in such a conference system, in some cases, communication is performed while material data prepared by a presentation program or the like is executed by a computer and is displayed on a monitor in the conference room in which one part of the participants are present. In this case, the conference system captures an execution screen of the material data on the computer by the communication apparatus of the conference room in which the one part of the participants are present and transmits the execution screen from the communication apparatus of the conference room in which the one part of the participants are present to the communication apparatus of the conference room in which the other part of the participants are present. Conventional technologies are disclosed in Japanese Patent Application Laid-open No. 2014-056454 and U.S. Pat. No. 6,760,749, for example.

When communication conditions of a network deteriorate, the resolution of the execution screen of the material data deteriorates, and characters, drawings, and the like in the conference room in which the other part of the participants are present become difficult to see. In the conference system, before the start of communication, user authentication for users and communication establishment processing (formation of a session) between a plurality of communication apparatuses are required to be performed, for example, which may take time until the communication finally starts. In this case, it is preferable that the participants be able to refer to even only the material data in advance before the start of the communication.

In view of the above, there is a need to provide a transmission system, an information processing apparatus, a computer program product, and a method of information processing that enable reference to material data in advance or more surely.

SUMMARY OF THE INVENTION

It is an object of the present invention to at least partially solve the problems in the conventional technology.

A transmission system includes a first information processing apparatus and a second information processing apparatus and transmits information from the first information processing apparatus to the second information processing apparatus. The first information processing apparatus includes: a material transmitter that uploads material data to a third information processing apparatus; an operation acquiring unit that acquires an operation by a user and outputs operation information indicating the acquired operation; and a transmission side controller that causes a transmission side display unit to display the material data and changes how the material data is displayed in accordance with the operation by the user. The second information processing apparatus includes: a material receiver that downloads the material data from the third information processing apparatus; and a reception side controller that causes a reception side display unit to display the downloaded material data and changes how the material data is displayed in accordance with the operation information acquired by the first information processing apparatus.

A method is of information processing in a transmission system that includes a first information processing apparatus and a second information processing apparatus and transmits information provided from a user of the first information processing apparatus to a user of the second information processing apparatus via a network. The method includes: uploading, by the first information processing apparatus, material data to a third information processing apparatus; causing, by the first information processing apparatus, a transmission side display unit to display the material data and changing, by the first information processing apparatus, how the material data is displayed in accordance with an operation by the user; acquiring, by the first information processing apparatus, the operation by the user on the material data displayed on the transmission side display unit and outputting, by the first information processing apparatus, operation information indicating the acquired operation; downloading, by the second information processing apparatus, the material data from the third information processing apparatus; and opening, by the second information processing apparatus, the downloaded material data to cause a reception side display unit to display the material data and changing, by the second information processing apparatus, how the material data is displayed in accordance with the operation information output by the first information processing apparatus.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes a transmission system 10 according to a first embodiment with reference to the drawings. The transmission system 10 is a system for causing users at remote positions to communicate with each other.

Overall Configuration

Figure 1:
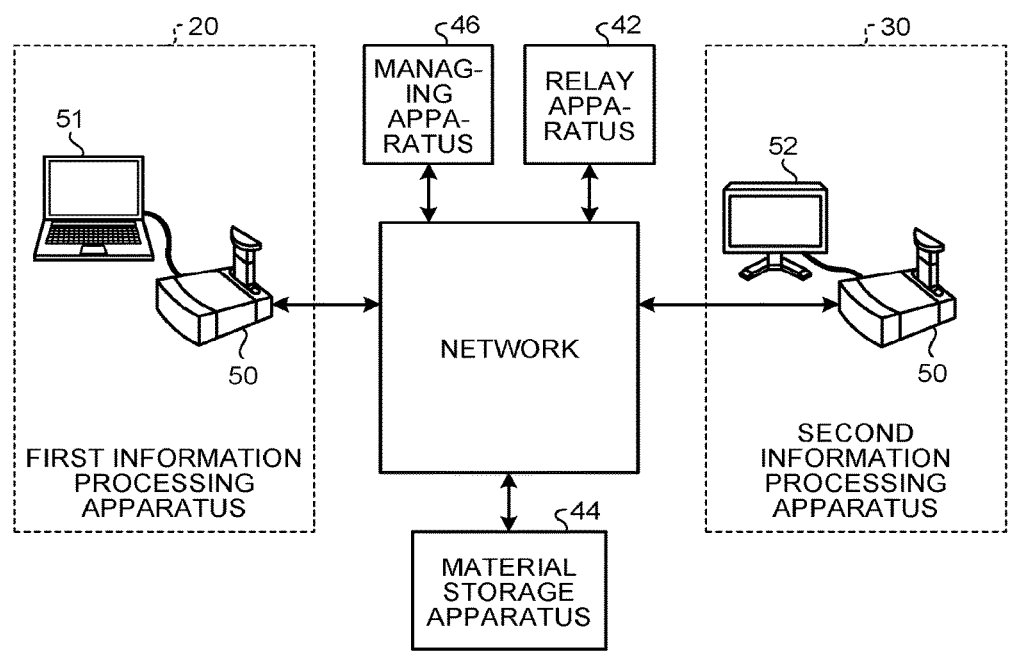
FIG. 1 is a diagram of a transmission system according to an embodiment.

FIG. 1 is a diagram of the transmission system 10 according to the embodiment. The transmission system 10 includes a first information processing apparatus 20, a second information processing apparatus 30, a relay apparatus 42, a material storage apparatus 44, and a managing apparatus 46.

The first information processing apparatus 20, the second information processing apparatus 30, the relay apparatus 42, the material storage apparatus 44 (a third information processing apparatus), and the managing apparatus 46 are connected to each other via a network to achieve data transmission and reception. The network may be a local area network (LAN), a wide area network (WAN), the WAN containing a public network, or any network.

The first information processing apparatus 20 is operated by a transmission side user. The second information processing apparatus 30 is operated by a reception side user.

The transmission system 10 transmits information such as voice data, image data, and control data from the first information processing apparatus 20 to the second information processing apparatus 30 in real time. Although the present embodiment describes an example in which information transmits unidirectionally from the first information processing apparatus 20 to the second information processing apparatus 30, information may be transmitted bidirectionally. The transmission system 10 may include a plurality of second information processing apparatuses 30 and transmit information from one first information processing apparatus 20 to the second information processing apparatuses 30 simultaneously.

The present embodiment describes a case in which the transmission system 10 is used for a teleconference (video-conference) system or the like. The transmission system 10 can also be used not only for the teleconference system but also for a voice conference system, a voice phone system (including a cellular phone system), a text chat system, or a whiteboard sharing system, for example.

The relay apparatus 42 is an information processing apparatus such as a server or a computer. The relay apparatus 42 transfers data received from the first information processing apparatus 20 to the second information processing apparatus 30.

The material storage apparatus 44 is an information processing apparatus such as a server or a computer. The material storage apparatus 44 receives material data from the first information processing apparatus 20 and stores therein the material data. The material storage apparatus 44 transmits the stored material data to the second information processing apparatus 30 via the network. In other words, the reception side user operates the second information processing apparatus 30 to receive the material data from the material storage apparatus 44. The material storage apparatus 44 may be a cloud storage that can share files on the network, as an example. In the present embodiment, the material storage apparatus 44 performs security authentication on an apparatus that accesses the files.

The managing apparatus 46 is an information processing apparatus such as a server or a computer. The managing apparatus 46 establishes communication between the first information processing apparatus 20 and the second information processing apparatus 30 via the relay apparatus 42 and forms a session between a plurality of communication apparatuses 50.

The first information processing apparatus 20 includes a communication apparatus 50 and a computer 51. The second information processing apparatus 30 includes the communication apparatus 50 and a display apparatus 52.

The communication apparatus 50 is used commonly by each of the first information processing apparatus 20 and the second information processing apparatus 30. The communication apparatus 50 performs various kinds of data input and data output. Specifically, the communication apparatus 50 inputs and outputs voice data obtained by collecting voices of the users, image data obtained by imaging the users, control data, and the like.

The communication apparatus 50 can transmit the voice data, the image data, and the control data to the other communication apparatus 50 via the relay apparatus 42 on the network. The communication apparatus 50 can receive the voice data, the image data, and the control data from the other communication apparatus 50 via the relay apparatus 42 on the network. The communication apparatus 50 can reproduce the received voice data and image data and output the voice data and the image data to the users. The communication apparatus 50 can perform various kinds of control in accordance with the received control data.

In the present embodiment, the communication apparatus 50 is an exclusive apparatus for the teleconference system. The communication apparatus 50 may be a general-purpose computer such as a desktop or notebook computer, a portable information device such as a smartphone or a tablet terminal, an electronic blackboard, a projector, an automobile, an industrial device, or the like, not the exclusive apparatus. The communication apparatus 50 may be another device so long as it can perform communication via the network and information input and output, not limited to these apparatuses.

External devices such as the computer 51 and the display apparatus 52 can be connected to the communication apparatus 50. In the present embodiment, the computer 51 is connected to the communication apparatus 50 of the first information processing apparatus 20. The display apparatus 52 is connected to the communication apparatus 50 of the second information processing apparatus 30.

The computer 51 of the first information processing apparatus 20 executes the material data on an application program and causes a monitor to display an execution result. The material data is data prepared by various kinds of computer programs such as a document preparation program, a spreadsheet program, a presentation program, a drawing preparation program, and photograph editing program. The material data may be document data, moving image data, or still image data.

The material data is delivered from the first information processing apparatus 20 to the second information processing apparatus 30 via the material storage apparatus 44 prior to the start of a conference. Specifically, the computer 51 of the first information processing apparatus 20 uploads the material data to the material storage apparatus 44 in advance prior to the start of the conference. The communication apparatus 50 of the second information processing apparatus 30 downloads the material data from the material storage apparatus 44 in advance prior to the start of the conference.

When a keyboard, a mouse, or the like is operated by the transmission side user while executing the material data, the computer 51 of the first information processing apparatus 20 changes the display state of the material data. When a page change button is operated using the keyboard or the mouse, the computer 51 changes the page of the material data being displayed, for example. When a scroll bar is operated using the keyboard or the mouse, the computer 51 scrolls the material data being displayed, for example.

When an operation is performed on the material data being displayed, the computer 51 acquires operation information indicating its operation details and gives the acquired operation information to the communication apparatus 50. When any key of the keyboard is pressed, the computer 51 acquires the type of the pressed button and the number of times of being pressed as the operation information, for example. When the mouse is operated, the computer 51 acquires a movement direction and a movement distance of a pointer as the operation information, for example. The acquisition of the operation information can be achieved by an existing technique that implements an application program interface (API) that acquires operation states of a keyboard, a mouse, or the like to an application, for example.

The communication apparatus 50 of the first information processing apparatus 20 incorporates the operation information received from the computer 51 into the control data and transmits the control data to the second information processing apparatus 30 via the network.

When receiving the operation information from the first information processing apparatus 20 while executing the material data, the communication apparatus 50 of the second information processing apparatus 30 determines that the same operation as the operation indicated by the operation information has been performed on the material data being displayed and changes the display state of the material data displayed on the display apparatus 52. If the operation information indicates that any button of the keyboard has been pressed, the communication apparatus 50 of the second information processing apparatus 30 changes the display state of the material data similarly to a case in which the button is pressed, for example. If the operation information indicates that the pointer has been moved in any direction by any distance, the communication apparatus 50 of the second information processing apparatus 30 changes the display state of the material data similarly to a case in which the pointer has been moved in the direction by the distance, for example. With this processing, the communication apparatus 50 of the second information processing apparatus 30 can make the display state of the material data on the display apparatus 52 the same as the display state of the material data displayed on the monitor of the computer 51 of the first information processing apparatus 20.

Examples of the first information processing apparatus 20 and the second information processing apparatus 30 are not limited to the configurations of the present embodiment and may include a general-purpose computer such as a desktop or notebook personal computer (PC). The first information processing apparatus 20 and the second information processing apparatus 30 can be devices such as a tablet, a smartphone, and a cellular phone so long as they are computers that can perform data transmission and reception and screen display.

Figure 2:
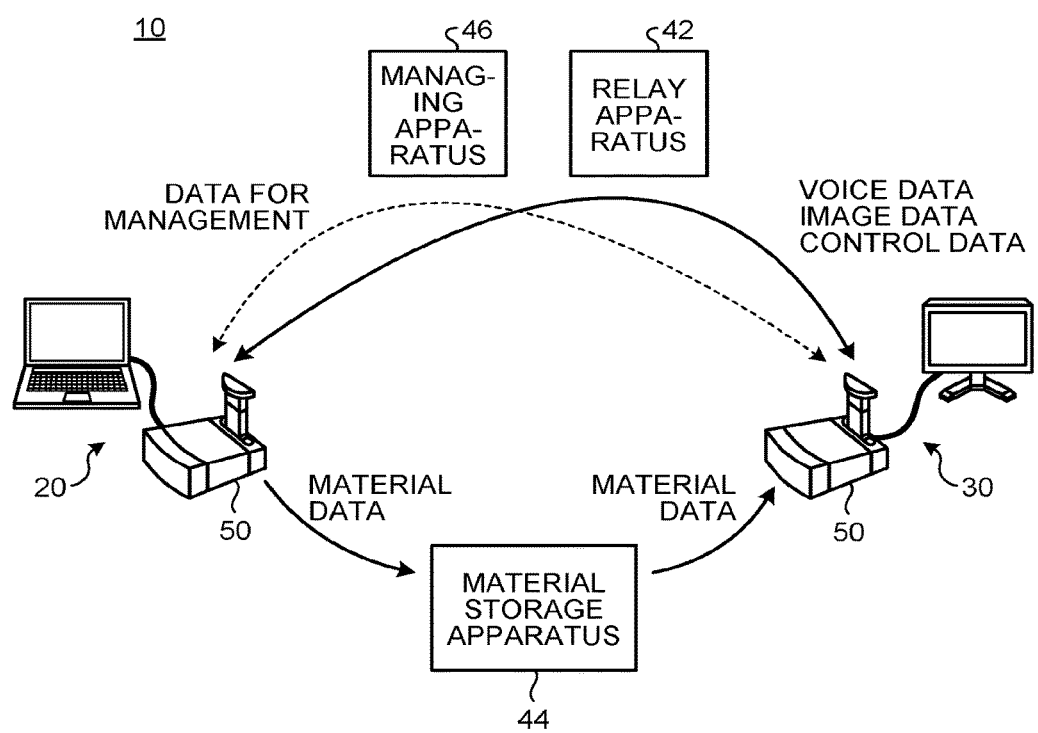
FIG. 2 is a diagram of data transmission processing by the transmission system.

FIG. 2 is a diagram of data transmission processing by the transmission system 10. The relay apparatus 42 controls transfer of the data (the voice data, the image data, and the control data) from the first information processing apparatus 20 to the second information processing apparatus 30. The material storage apparatus 44 receives the material data from the first information processing apparatus 20 and temporarily stores therein the material data. The material storage apparatus 44 transmits the stored material data to the second information processing apparatus 30. The managing apparatus 46 controls the transfer of data for management, forms a session between the communication apparatuses 50, and enables data transmission and reception between the communication apparatuses 50 for which the session has been formed.

The relay apparatus 42, the material storage apparatus 44, and the managing apparatus 46 may be implemented by one server or computer or implemented by cooperative operation of a plurality of servers or computers. The relay apparatus 42 and a set of the material storage apparatus 44 and the managing apparatus 46 may be implemented in one server or computer. The managing apparatus 46 may be implemented by any communication apparatus 50.

External Appearance and Hardware Configuration

Figure 3:
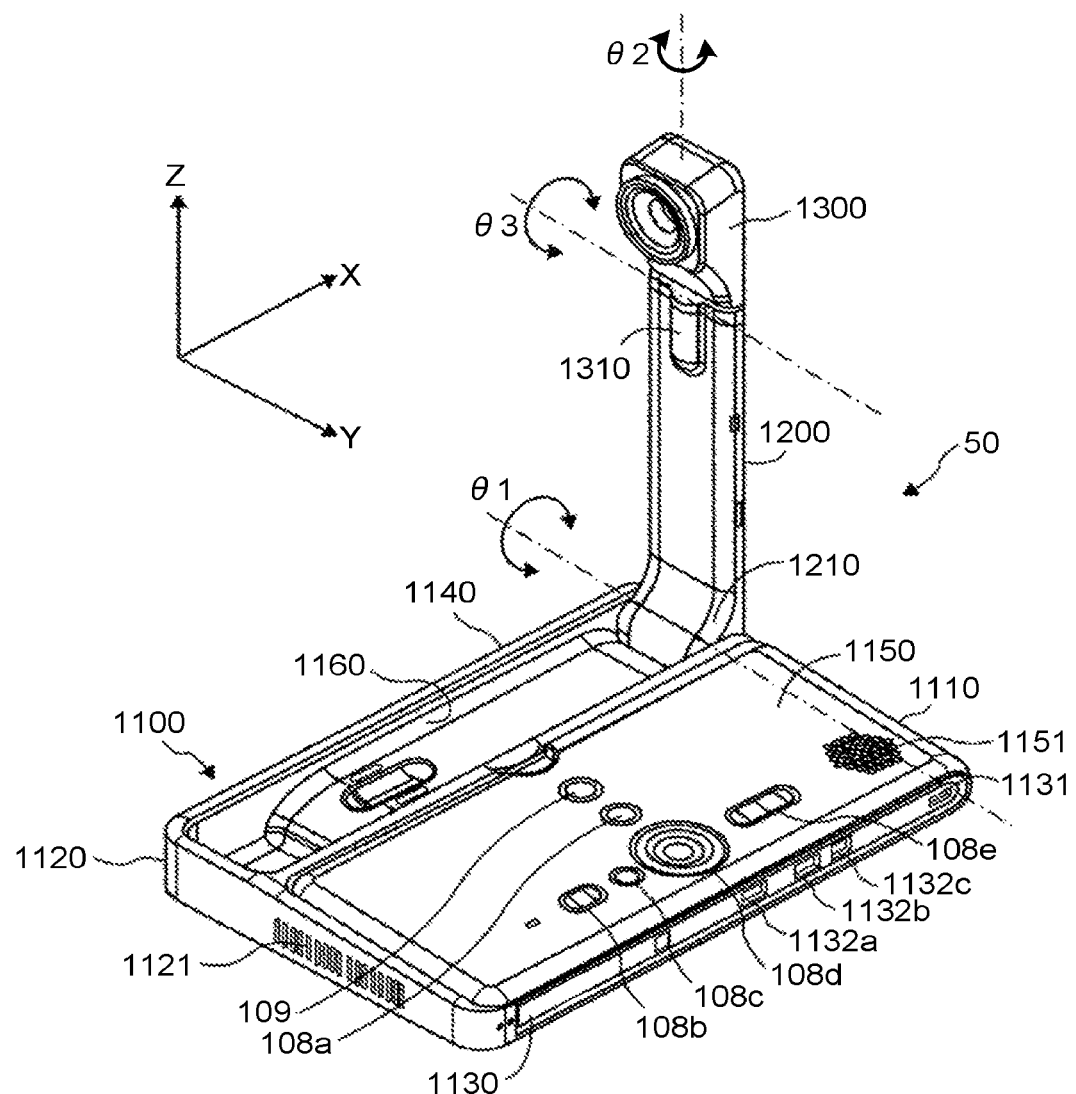
FIG. 3 is a diagram of an example of an external appearance of a communication apparatus.

FIG. 3 is a diagram of an example of an external appearance of the communication apparatus 50. In FIG. 3, a preset direction in the horizontal plane is an X-axial direction (a front-and-rear direction). In FIG. 3, a direction perpendicular to the X-axial direction is a Y-axial direction, and a direction (a vertical direction) perpendicular to the X-axial direction and the Y-axial direction is a Z-axial direction.

As illustrated in FIG. 3, the communication apparatus 50 includes a housing 1100, an arm 1200, and a camera housing 1300. A rear wall face 1110 of the housing 1100 is formed with plurality of inlet ports. A front wall face 1120 of the housing 1100 is formed with a plurality of exhaust ports 1121. With this structure, the communication apparatus 50 can take in rear outside air by the drive of a cooling fan incorporated into the housing 1100 and exhaust the air to the front via the exhaust ports 1121. A right wall face 1130 of the housing 1100 is formed with a sound collecting hole 1131. With this structure, the communication apparatus 50 can collect voices produced by the users, surrounding sounds, noise, and the like by a built-in microphone 114 described below.

The right side of the upper part of the housing 1100 is formed with an operating panel 1150. The operating panel 1150 includes a plurality of operating buttons 108a to 108e and a power supply switch 109. The operating buttons 108a to 108e may be expressed collectively as an operating button 108. The operating panel 1150 is formed with a plurality of sound output holes 1151 for passing output sounds from a built-in speaker 115 described below.

The left side of the upper part of the housing 1100 is formed with the arm 1200 and a housing recess 1160 for housing the camera housing 1300. The right wall face 1130 of the housing 1100 is provided with a plurality of connection ports 1132a to 1132c for electrically connecting cables to an external device connection interface (I/F) 118 described below for connecting to the computer 51 as an external apparatus. A left wall face 1140 of the housing 1100 is formed with a connection port for electrically connecting a cable for the display apparatus 52 to a display I/F 117 described below.

The arm 1200 is mounted on the housing 1100 via a torque hinge 1210. The arm 1200 can rotate in an up-and-down direction with a range of a tilt angle θ1 of 135 degrees relative to the housing 1100, for example. FIG. 3 illustrates the arm 1200 in which the tilt angle θ1 is 90 degrees.

The camera housing 1300 is provided with a built-in camera 112 described below. With this structure, the communication apparatus 50 can image the users, documents, rooms, and the like. The camera housing 1300 is mounted on the arm 1200 via a torque hinge 1310. The camera housing 1300 can rotate in up-and-down and right-and-left directions with a range of a pan angle θ2 of ±180 degrees and with a range of a tilt angle θ3 of ±45 degrees with the state illustrated in FIG. 3 as 0 degrees relative to the arm 1200.

Figure 4:
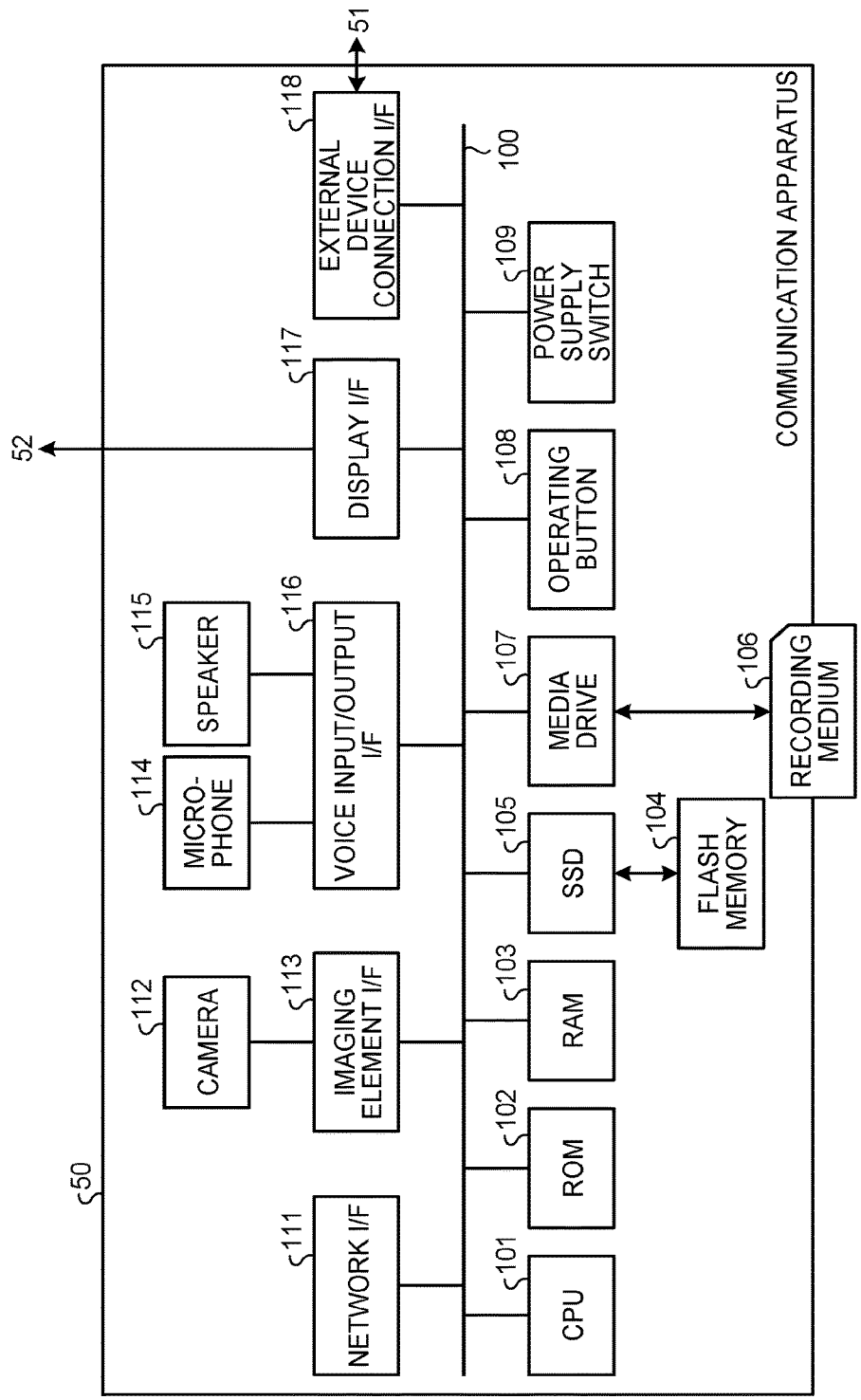
FIG. 4 is s diagram of a hardware configuration of the communication apparatus.

FIG. 4 is a diagram of a hardware configuration of the communication apparatus 50. The communication apparatus 50 includes a bus line 100, a central processing unit (CPU) 101, a read only memory (ROM) 102, a random access memory (RAM) 103, a flash memory 104, a solid state drive (SSD) 105, a media drive 107, the operating button 108, the power supply switch 109, a network I/F 111, the camera 112, an imaging element I/F 113, the microphone 114, the speaker 115, a voice input/output I/F 116, the display I/F 117, and the external device connection I/F 118. The bus line 100 is an address bus and a data bus for connecting the components with each other, for example.

The CPU 101 controls the operation of the entire communication apparatus 50. The CPU 101 executes computer programs. The ROM 102 stores therein computer programs for use in the drive of the CPU 101 such as an initial program loader (IPL). The RAM 103 is used as a work area of the CPU 101. The flash memory 104 stores therein a transfer control program for the communication apparatus 50, an application program, and various kinds of data such as image data, voice data, and material data. The communication apparatus 50 may include an electrically erasable and programmable ROM (EEPROM) in place of the flash memory 104. The SSD 105 controls the reading or writing of various kinds of data from or to the flash memory 104 in accordance with the control of the CPU 101. The media drive 107 controls the reading or writing (storing) of data from or to a recording medium 106 such as a flash memory that can be attached and detached to and from the communication apparatus 50.

The operating button 108 is a button for inputting operation information of the users. The power supply switch 109 is a button for switching between on and off of the power supply of the communication apparatus 50. The network I/F 111 controls communication via the network.

The camera 112 images subjects in accordance with the control of the CPU 101 to obtain image data. The camera 112 includes a lens and a solid-state imaging element that converts light into electric charges to digitize images of the subjects. Examples of the solid-state imaging element include a complementary metal oxide semiconductor (CMOS) and a charge coupled device (CCD).

The imaging element I/F 113 controls the drive of the camera 112. The microphone 114, which is of the built-in type, receives input of voices. The speaker 115, which is of the built-in type, outputs voices. The voice input/output I/F 116 processes input and output of sound signals in between the microphone 114 and the speaker 115 in accordance with the control of the CPU 101.

The display I/F 117 transmits image data to the display apparatus 52 in accordance with the control of the CPU 101. The display apparatus 52 is connected to the display I/F 117 via a cable. The cable may be a cable for analog RGB (VGA) signals, a cable for component video, or a cable for High-Definition Multimedia Interface (HDMI) (registered trademark) or digital video interactive (DVI) signals.

The external device connection I/F 118 is an interface circuit for connecting to an external device. In the present embodiment, the external device connection I/F 118 is connected to the computer 51 for displaying the material data via a universal serial bus (USB) cable or the like.

Figure 5:
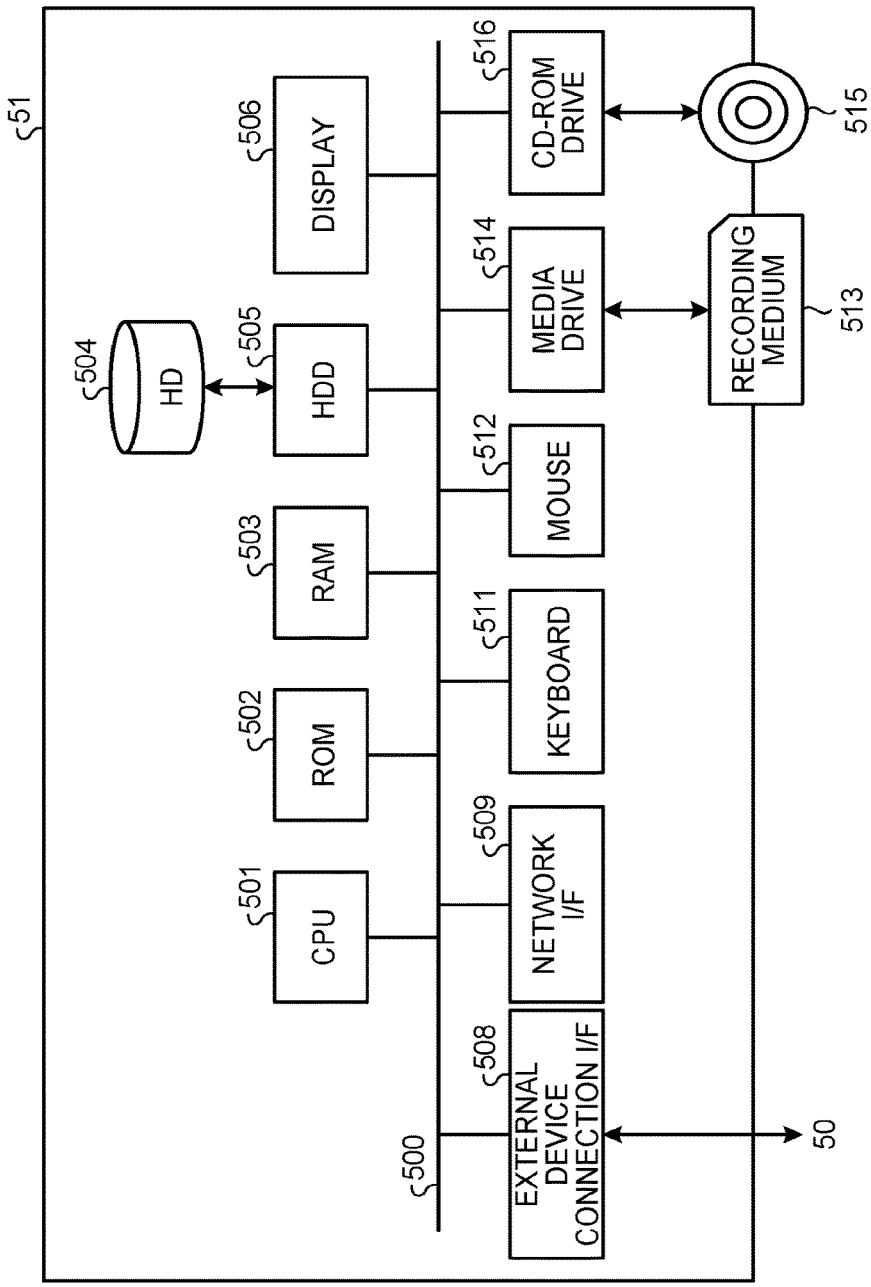
FIG. 5 is a diagram of a hardware configuration of a computer.

FIG. 5 is a diagram of a hardware configuration of the computer 51. The computer 51 includes a bus line 500, a CPU 501, a ROM 502, a RAM 503, a hard disk (HD) 504, a hard disk drive (HDD) 505, a display 506, an external device connection I/F 508, a network I/F 509, a keyboard 511, a mouse 512, a media drive 514, and a CD-ROM drive 516. The bus line 500 is an address bus and a data bus for connecting the components with each other, for example.

The CPU 501 executes computer programs. The ROM 502 stores therein computer programs for use in the drive of the CPU 501 such as the IPL. The RAM 503 is used as a work area of the CPU 501. The HD 504 stores therein an application program for displaying the material data, the material data, and the like. The HDD 505 controls the reading or writing of various data from or to the HD 504 in accordance with the control of the CPU 501. The display 506 displays various kinds of information.

The external device connection I/F 508 is an interface circuit for connecting to the external device. In the present embodiment, the external device connection I/F 508 is connected to the communication apparatus 50 via a USB cable or the like. The network I/F 509 controls communication via the network The keyboard 511 includes a plurality of keys for inputting characters, numeric values, various kinds of instructions, and the like. The mouse 512 selects and executes various kinds of instructions, selects an object to be processed, and moves a pointer. The media drive 514 controls the reading or writing (storing) of data from or to a detachable recording medium 513 such as a flash memory. The CD-ROM drive 516 controls the reading or writing of various kinds of data from or to a compact disk read only memory (CD-ROM) 515 as an example of a detachable recording medium.

Figure 6:
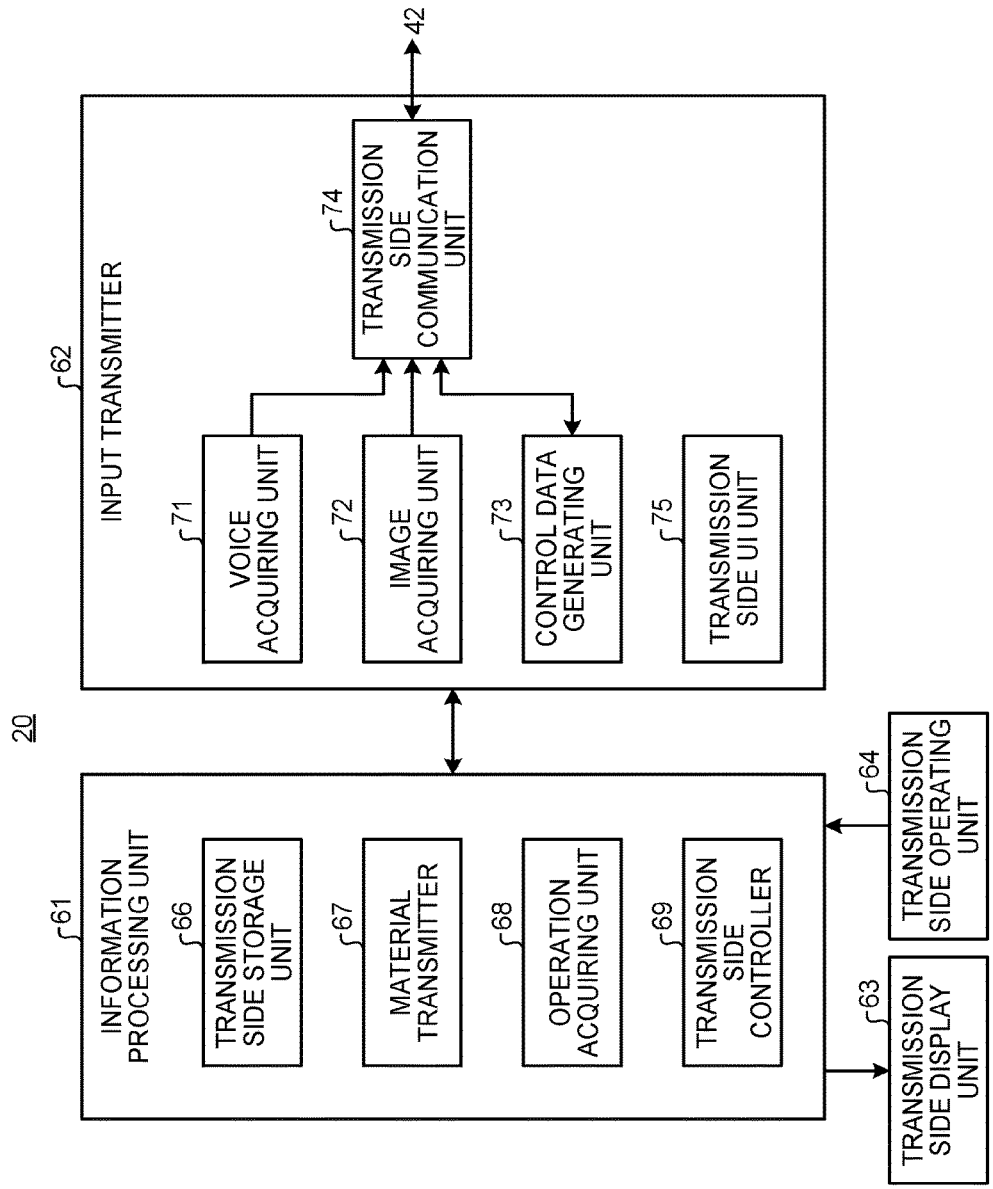
FIG. 6 is a diagram of a functional configuration of a first information processing apparatus.

FIG. 6 is a diagram of a functional configuration of the first information processing apparatus 20. The first information processing apparatus 20 includes the functional configuration illustrated in FIG. 6. In other words, the first information processing apparatus 20 includes an information processing unit 61, an input transmitter 62, a transmission side display unit 63, and a transmission side operating unit 64.

The information processing unit 61 is a functional block implemented by causing the computer 51 to execute a computer program for conference. The input transmitter 62 is a functional block implemented by the communication apparatus 50. The transmission side display unit 63 displays information under the control by the information processing unit 61. The transmission side display unit 63 is a functional block implemented by the display 506 of the computer 51. The transmission side operating unit 64 receives input of operations by the transmission side user. The transmission side operating unit 64 is a functional block implemented by the keyboard 511, the mouse 512, and the like of the computer 51.

The information processing unit 61 includes a transmission side storage unit 66, a material transmitter 67, an operation acquiring unit 68, and a transmission side controller 69. The transmission side storage unit 66 stores therein the material data. The material transmitter 67 uploads the material data stored in the transmission side storage unit 66 to the material storage apparatus 44 via the network.

The operation acquiring unit 68 acquires operations by the transmission side user on the transmission side operating unit 64. The operation acquiring unit 68 acquires a pressing operation of a button of the keyboard 511 and a moving operation of the pointer by the mouse 512, as examples. The operation acquiring unit 68 outputs the operation information indicating the acquired operation to the input transmitter 62. The operation information contains information indicating the type and the number of times of the pressed button or the movement direction and the movement amount of the pointer, for example.

The transmission side controller 69 executes the material data on the application program and causes the transmission side display unit 63 to display the material data, for example. Furthermore, the transmission side controller 69 changes the display state of the material data in accordance with an operation by the transmission side user using the transmission side operating unit 64. When a page change button is operated by the keyboard 511 or the mouse 512, the transmission side controller 69 changes the page of the material data being displayed, for example. When a scroll bar is operated by the keyboard 511 or the mouse 512, the transmission side controller 69 scrolls the material data being displayed, for example.

The input transmitter 62 includes a voice acquiring unit 71, an image acquiring unit 72, a control data generating unit 73, a transmission side communication unit 74, and a transmission side UI unit 75. The voice acquiring unit 71 controls the microphone 114 illustrated in FIG. 4 to acquire voices and generates voice data indicating the acquired voices. The voice acquiring unit 71 outputs the generated voice data to the transmission side communication unit 74. The image acquiring unit 72 controls the camera 112 illustrated in FIG. 4 to acquire images and generates image data indicating the acquired images. The image acquiring unit 72 outputs the generated image data to the transmission side communication unit 74.

The control data generating unit 73 acquires the operation information from the operation acquiring unit 68 of the information processing unit 61. The control data generating unit 73 generates the control data containing the acquired operation information.

The transmission side communication unit 74 receives the voice data from the voice acquiring unit 71, receives the image data from the image acquiring unit 72, and receives the control data from the control data generating unit 73. The transmission side communication unit 74 transmits the voice data, the image data, and the control data to the second information processing apparatus 30 via the relay apparatus 42 on the network in real time. The transmission side UI unit 75 controls the operating button 108 illustrated in FIG. 4 and the like to input operations on the communication apparatus 50 by the transmission side user.

When communication with the second information processing apparatus 30 is ended, the control data generating unit 73 incorporates an end instruction into the control data. When the material data is made referable even after the end of the communication, the control data generating unit 73 also incorporates reference permission information into the control data.

Figure 7:
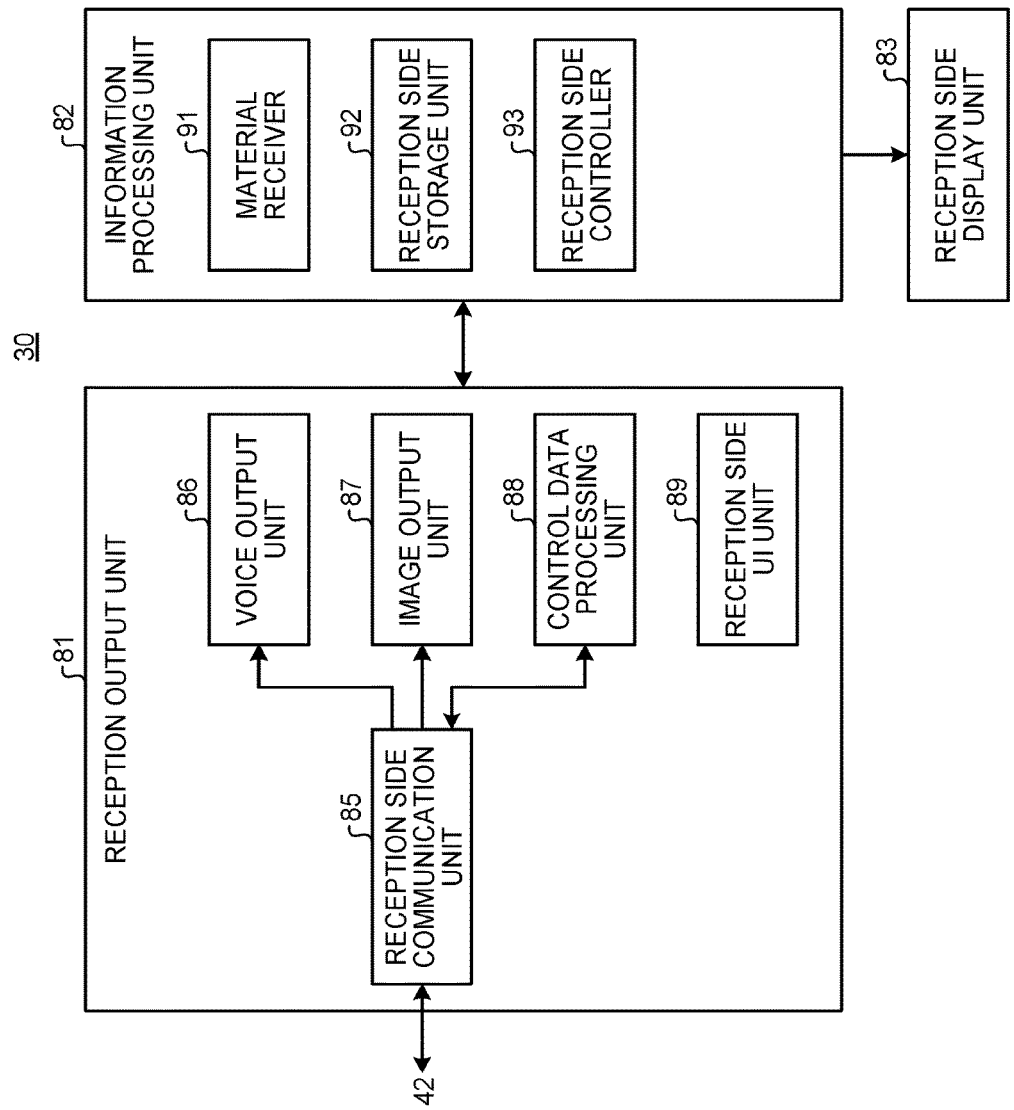
FIG. 7 is a diagram of a functional configuration of a second information processing apparatus.

FIG. 7 is a diagram of a functional configuration of the second information processing apparatus 30. The second information processing apparatus 30 includes the functional configuration illustrated in FIG. 7. In other words, the second information processing apparatus 30 includes a reception output unit 81, an information processing unit 82, and a reception side display unit 83.

The reception output unit 81 is a functional block implemented by the communication apparatus 50. The information processing unit 82 is a functional block implemented by causing the CPU 101, the ROM 102, the RAM 103, the flash memory 104, or the like of the communication apparatus 50 to execute computer programs. The reception side display unit 83 is a functional block implemented by the display apparatus 52.

The reception output unit 81 includes a reception side communication unit 85, a voice output unit 86, an image output unit 87, a control data processing unit 88, and a reception side UI unit 89. The information processing unit 82 includes a material receiver 91, a reception side storage unit 92, and a reception side controller 93.

The reception side communication unit 85 receives the voice data, the image data, and the control data from the first information processing apparatus 20 via the relay apparatus 42 on the network in real time. The reception side communication unit 85 gives the received voice data to the voice output unit 86. The reception side communication unit 85 gives the received image data to the image output unit 87. The reception side communication unit 85 gives the received control data to the control data processing unit 88. The voice output unit 86 reproduces the voice data received by the reception side communication unit 85. The voice output unit 86 controls the speaker 115 illustrated in FIG. 4 to output voices.

The image output unit 87 reproduces the image data received by the reception side communication unit 85. The image output unit 87 controls the display I/F 117 illustrated in FIG. 4 to output images to the display apparatus 52.

The control data processing unit 88 analyzes the control data received by the reception side communication unit 85 to acquire the operation information contained in the control data. The control data processing unit 88 gives the acquired operation information to the reception side controller 93 of the information processing unit 82.

When the end instruction is contained in the control data, the control data processing unit 88 gives the end instruction contained in the control data to the reception side controller 93. When the reference permission information is contained in the control data, the control data processing unit 88 gives the reference permission information contained in the control data to the reception side controller 93.

The reception side UI unit 89 controls the operating button 108 illustrated in FIG. 4 or the like to input an operation on the communication apparatus 50 by the reception side user.

The material receiver 91 downloads the material data from the material storage apparatus 44 via the network. The reception side storage unit 92 stores therein the material data downloaded by the material receiver 91.

The reception side controller 93 executes the material data downloaded and stored in the reception side storage unit 92 and causes the reception side display unit 83 to display the material data. Furthermore, the reception side controller 93 acquires the operation information contained in the control data transmitted from the first information processing apparatus 20 from the control data processing unit 88. The reception side controller 93 changes the display state of the material data in accordance with the acquired operation information.

More specifically, the reception side controller 93 determines that the same operation as the operation indicated by the operation information has been performed on the material data being displayed and changes the display state of the material data. When the operation information indicates that any button of the keyboard 511 has been pressed, the reception side controller 93 changes the display state of the material data similarly to a case in which the button is pressed, for example. When the operation information indicates that the pointer has been moved in any direction by any distance by the mouse 512, the reception side controller 93 changes the display state of the material data similarly to a case in which the pointer has been moved in the direction by the distance, for example. With this processing, the reception side controller 93 can make the display state of the material data displayed on the reception side display unit 83 the same as the display state of the material data displayed on the transmission side display unit 63.

When the end instruction is given from the control data processing unit 88, the reception side controller 93 deletes the downloaded material data from the reception side storage unit 92. With this processing, the reception side controller 93 can make the reception side user unable to refer to the material data after the end of the conference. When the reference permission information is given, the reception side controller 93 does not delete the downloaded material data from the reception side storage unit 92. With this processing, the reception side controller 93 can make the material data permitted by the transmission side user referable after the end of the conference.

The reception side controller 93 may change the display state of the downloaded material data in accordance with an operation by the reception side user. When a page change button is operated by the operating button 108 or the like, the reception side controller 93 changes the page of the material data being displayed, for example. When a scroll bar is operated by the operating button 108 or the like, the reception side controller 93 scrolls the material data being displayed, for example.

Figure 8:
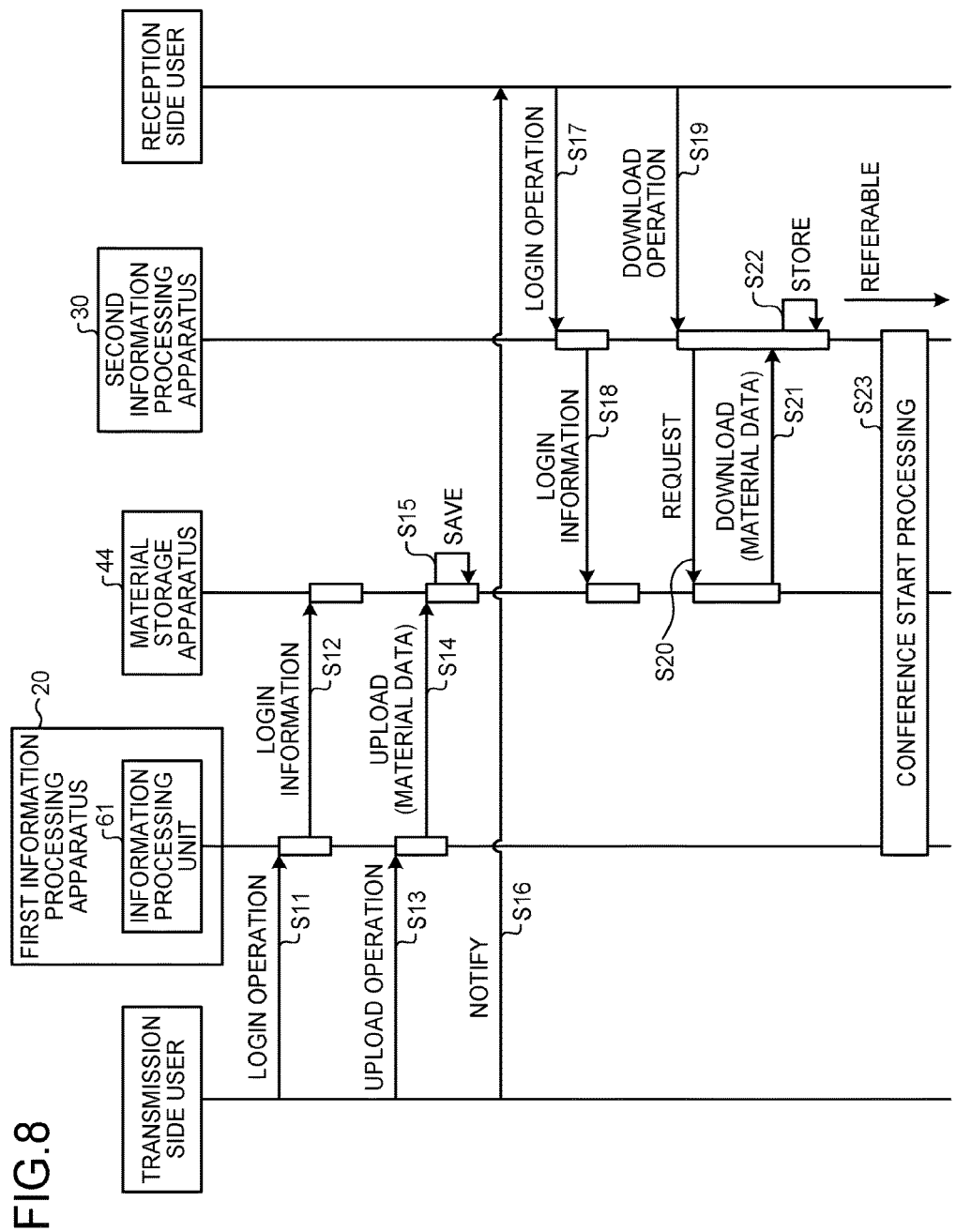
FIG. 8 is a sequence diagram of a procedure of preprocessing.

FIG. 8 is a sequence diagram of a procedure of preprocessing. Before the start of a conference, the transmission system 10 executes processing in accordance with the sequence illustrated in FIG. 8.

First, the transmission side user operates the information processing unit 61 of the first information processing apparatus 20 to start up a browser program and accesses a login page provided from the material storage apparatus 44 on the network. The transmission side user then performs a login operation on the accessed login page (S11). When the login operation is performed, the information processing unit 61 transmits login information (a user name and a password, for example) to the material storage apparatus 44 (S12). The material storage apparatus 44 authenticates the login information, and if the authentication is succeeded, receives access from the information processing unit 61 of the first information processing apparatus 20 thereafter.

Next, the transmission side user performs an upload operation of the material data on the information processing unit 61 (S13). When the upload operation is performed, the information processing unit 61 uploads the material data to the material storage apparatus 44 (S14). When the material data is uploaded, the material storage apparatus 44 saves the material data (S15).

Next, the transmission side user notifies the reception side user of the fact that the material data has been uploaded (S16). A method of notification from the transmission side user to the reception side user may be any method and may be by e-mail or phone, for example. The transmission side user also notifies the reception side user of information required for accessing the material data stored in the material storage apparatus 44 such as a file name and an address. In this case, if a plurality of users can access the material data stored in the material storage apparatus 44, the transmission side user is not required to notify the reception side user of the login information.

Next, the reception side user operates the second information processing apparatus 30 to start up a browser program and access the login page provided from the material storage apparatus 44 on the network. The reception side user performs a login operation on the accessed login page (S17). When the login operation is performed, the second information processing apparatus 30 transmits login information (a user name and a password, for example) to the material storage apparatus 44 (S18). The material storage apparatus 44 authenticates the login information, and if the authentication is succeeded, receives access from the second information processing apparatus 30 thereafter.

Next, the reception side user performs a download operation of the material data on the second information processing apparatus 30 (S19). When the download operation is performed, the second information processing apparatus 30 issues a download request to the material storage apparatus 44 (S20) and downloads the material data from the material storage apparatus 44 (S21). When the material data is downloaded, the second information processing apparatus 30 stores therein the material data (S22).

The reception side user can thereafter refer to the material data by operating the second information processing apparatus 30. The first information processing apparatus 20 and the second information processing apparatus 30 execute a certain conference start processing (S23).

As described above, the second information processing apparatus 30 can acquire the material data from the first information processing apparatus 20 prior to the conference. With this processing, the second information processing apparatus 30 can cause the reception side user to refer to the contents of the material data even in a preparatory stage of the conference or when the communication conditions of the network deteriorate, and favorable communication becomes difficult.

Figure 9:
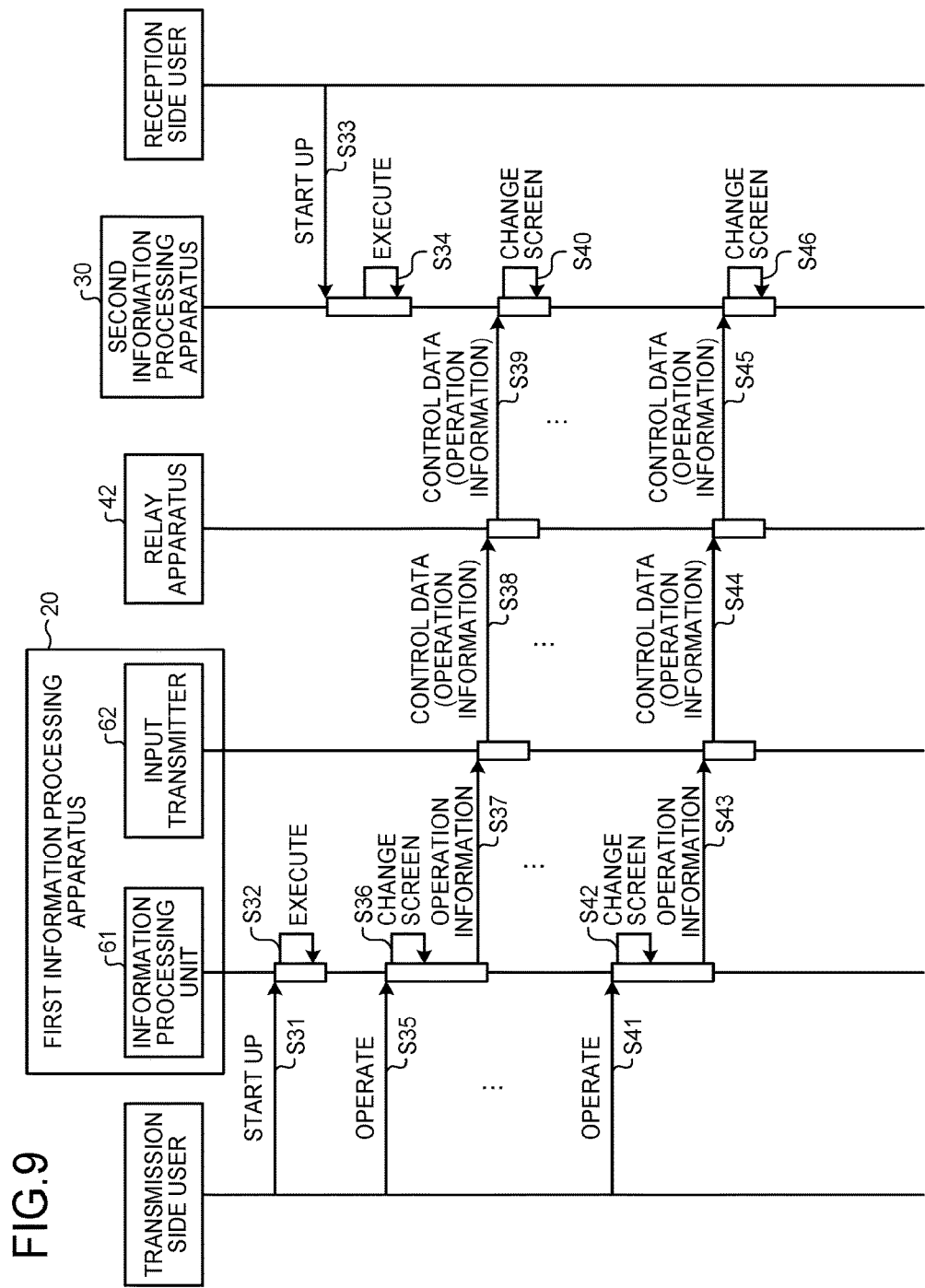
FIG. 9 is a sequence diagram of a procedure of processing during a conference.

FIG. 9 is a sequence diagram of a procedure of processing during a conference. During the conference, the transmission system 10 performs processing in accordance with the sequence illustrated in FIG. 9.

First, the transmission side user operates the information processing unit 61 of the first information processing apparatus 20 to perform a startup operation of the material data on a certain application program (S31). When the startup operation of the material data is performed, the information processing unit 61 executes the material date on the certain application program (S32). In this case, the information processing unit 61 makes the display state of the material data a preset initial state. The information processing unit 61 displays the first page of the material data, for example.

The reception side user also operates the second information processing apparatus 30 to perform a startup operation of the material data on a certain application program (S33). When the startup operation of the material data is performed, the second information processing apparatus 30 executes the material date on the certain application program (S34). Also in this case, the second information processing apparatus 30 makes the display state of the material data a preset initial state. The second information processing apparatus 30 displays the first page of the material data, for example.

Next, the transmission side user performs an operation of some kind on the material data using the keyboard 511, the mouse 512, or the like (S35). When the operation is performed by the transmission side user, the information processing unit 61 changes the display state of the material data to change a screen (S36). The information processing unit 61 changes the page of the material data being displayed or scrolls the material data being displayed, for example.

Next, the information processing unit 61 gives operation information indicating the operation by the transmission side user to the input transmitter 62 of the first information processing apparatus 20 (S37). The operation information contains information indicating the type and the number of times of the pressed button or the movement direction and the movement amount of the pointer as examples.

Next, the input transmitter 62 incorporates the received operation information into the control data and transmits the control data to the relay apparatus 42 on the network (S38). Next, the relay apparatus 42 transmits the received control data to the second information processing apparatus 30 (S39). Next, the second information processing apparatus 30 extracts the operation information contained in the control data received from the relay apparatus 42.

The second information processing apparatus 30 changes the display state of the material data similarly to a case in which the operation indicated by the extracted operation information is performed to change a screen (S40). The second information processing apparatus 30 changes the display state of the material data similarly to a case when any button is pressed or a case when the pointer is moved in any direction by any distance, for example.

The transmission system 10 thereafter performs similar processing every time an operation is performed on the material data by the transmission side user (S41 to S46). Consequently, the transmission system 10 can synchronize the display state of the material data in the second information processing apparatus 30 with the display state of the material data in the first information processing apparatus 20.

Figure 10:
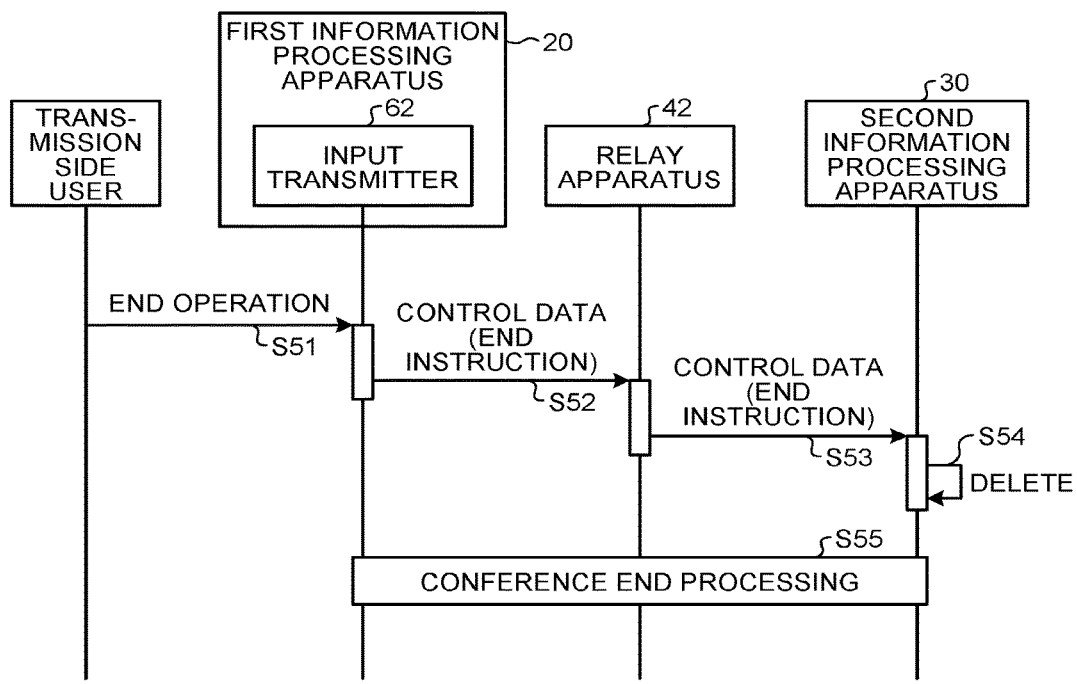
FIG. 10 is a sequence diagram of a procedure of processing at the end of the conference.

FIG. 10 is a sequence diagram of a procedure of processing at the end of the conference. At the end of the conference, the transmission system 10 executes processing in accordance with the sequence illustrated in FIG. 10.

First, the transmission side user performs an end operation on the input transmitter 62 of the first information processing apparatus 20 (S51). Next, the input transmitter 62 transmits the control data containing the end instruction to the relay apparatus 42 on the network (S52). Next, the relay apparatus 42 transmits the received control data to the second information processing apparatus (S53).

Next, when receiving the control data containing the end instruction from the relay apparatus 42, the second information processing apparatus 30 deletes the stored material data (S54). The first information processing apparatus 20 and the second information processing apparatus 30 execute certain conference end processing (S55). With this processing, the transmission system 10 can forbid the reception side user to refer to the material data after the end of the conference.

When the transmission side user performs an operation of reference permission, the input transmitter 62 transmits the control data containing the reference permission information to the second information processing apparatus 30 in advance. When acquiring the end instruction, if acquiring the reference permission information, the second information processing apparatus 30 does not execute the deletion of the material data. With this processing, the transmission system 10 enables the reception side user to refer to the material data after the end of the conference if permitted by the transmission side user.

As described above, the transmission system 10 according to the present embodiment can cause the reception side user to surely refer to the material data even when the communication conditions of the network deteriorate and in a preparatory stage of the conference. The transmission system 10 can change the display screen of the material data referred to by the reception side user in sync with the operation by the transmission side user, whereby the transmission side user and the reception side user can refer to the same information. The transmission system 10 deletes the material data stored in the second information processing apparatus 30 after the end of the communication, whereby the material data can be made not to be referred to after the end of the communication.

First Modification

Next, the following describes the transmission system 10 according to a first modification. The modification described below is almost the same as the transmission system 10 described with reference to FIG. 1 through FIG. 10, and the following mainly describes points of difference while components having substantially the same function and configuration are attached with the same symbols, and detailed descriptions thereof are omitted.

Figure 11:
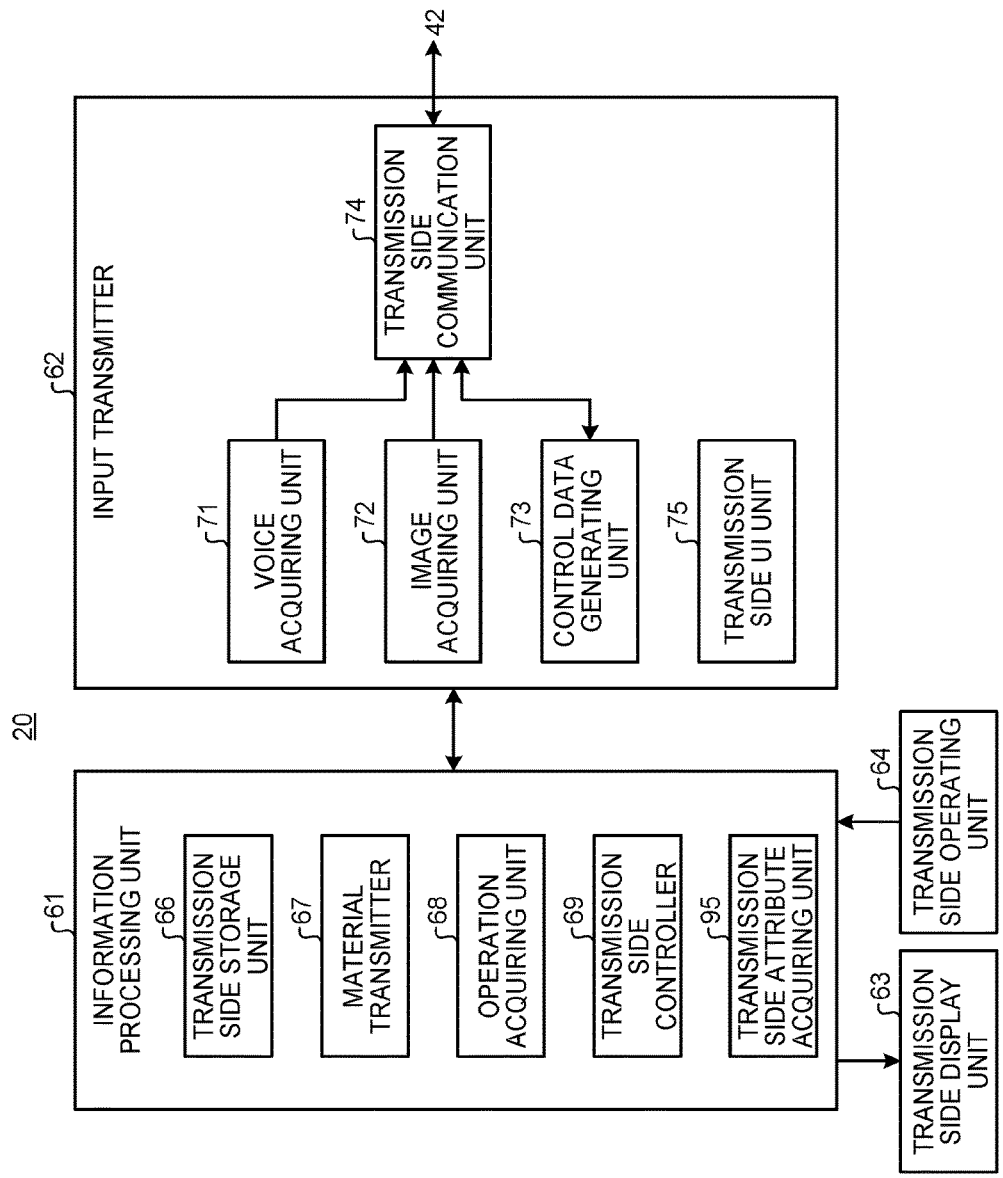
FIG. 11 is a diagram of a functional configuration of the first information processing apparatus according to a first modification.
Figure 12:
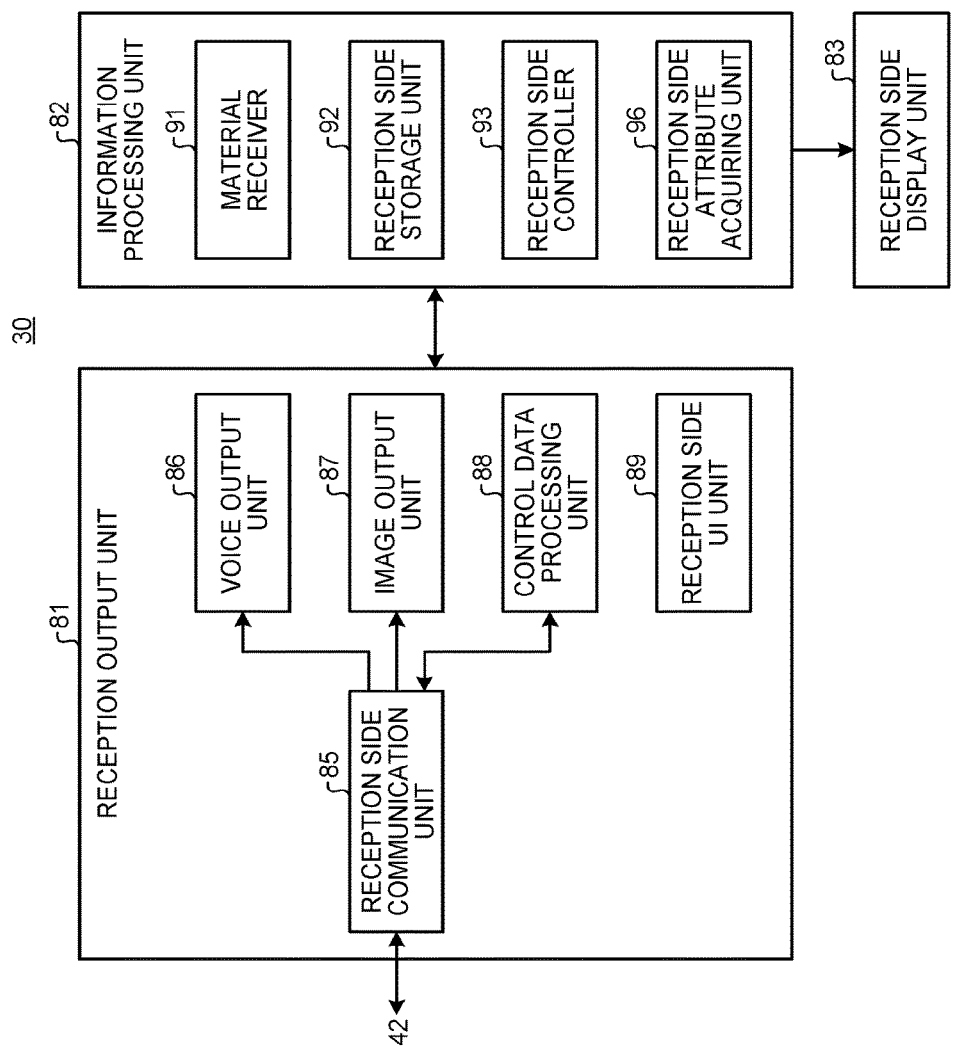
FIG. 12 is a diagram of a functional configuration of the second information processing apparatus according to the first modification.

FIG. 11 is a diagram of a functional configuration of the first information processing apparatus 20 according to the first modification. FIG. 12 is a diagram of a functional configuration of the second information processing apparatus 30 according to the first modification.

As illustrated in FIG. 11, the information processing unit 61 of the first information processing apparatus 20 according to the present modification further includes a transmission side attribute acquiring unit 95. As illustrated in FIG. 12, the information processing unit 82 of the second information processing apparatus 30 according to the present modification further includes a reception side attribute acquiring unit 96.

The transmission side attribute acquiring unit 95 acquires an attribute of the material data displayed on the transmission side display unit 63. The transmission side attribute acquiring unit 95 outputs attribute information indicating the acquired attribute to the control data generating unit 73.

The reception side attribute acquiring unit 96 acquires an attribute of the material data displayed on the reception side display unit 83. The reception side attribute acquiring unit 96 outputs attribute information indicating the acquired attribute to the control data processing unit 88. The control data processing unit 88 generates response data containing the attribute information. The reception side communication unit 85 transmits the response data to the first information processing apparatus 20 via the relay apparatus 42 on the network.

The transmission side communication unit 74 receives the response data from the second information processing apparatus 30 via the relay apparatus 42 on the network. The transmission side communication unit 74 gives the attribute information contained in the received response data to the control data generating unit 73.

The control data generating unit 73 determines whether the attribute of the material data displayed on the transmission side display unit 63 and the attribute of the material data displayed on the reception side display unit 83 match based on the attribute information acquired by the transmission side attribute acquiring unit 95 and the attribute information contained in the response data. If the attribute of the material data displayed on the transmission side display unit 63 and the attribute of the material data displayed on the reception side display unit 83 match, the control data generating unit 73 incorporates the operation information into the control data. In contrast, if the attribute of the material data displayed on the transmission side display unit 63 and the attribute of the material data displayed on the reception side display unit 83 do not match, the control data generating unit 73 does not incorporate the operation information into the control data.

The attribute information is metainformation of the material data such as a file name, an update date, and a hash value of the material data. Consequently, the control data generating unit 73 determines whether the attribute of the material data displayed on the transmission side display unit 63 and the attribute of the material data displayed on the reception side display unit 83 match, thereby determining whether the same data is displayed on the transmission side display unit 63 and the reception side display unit 83. The control data generating unit 73 incorporates the operation information into the control data when the attributes match, thereby preventing the information displayed on the reception side display unit 83 from being changed by the operation by the transmission side user when different pieces of information are displayed on the transmission side display unit 63 and the reception side display unit 83.

Figure 13:
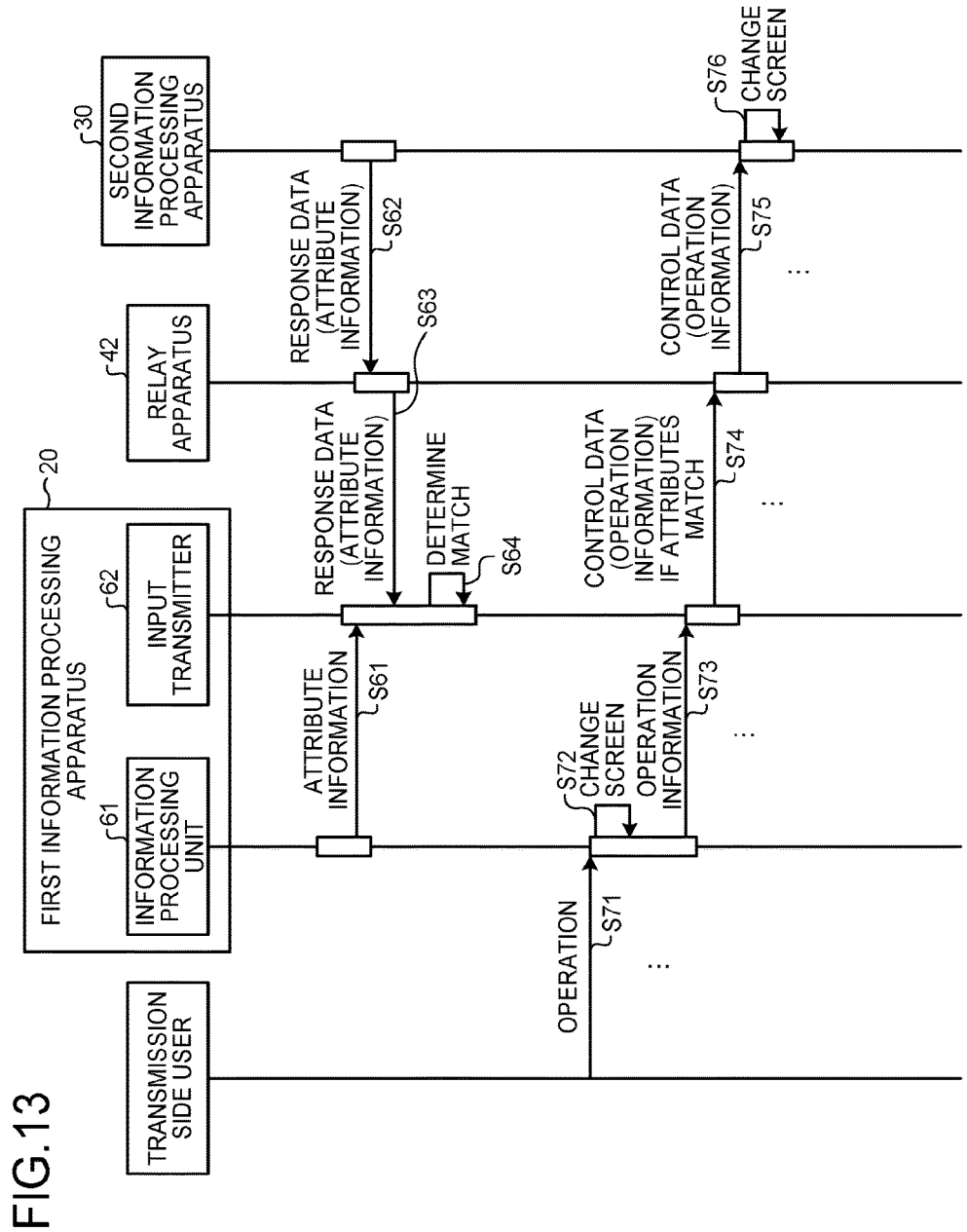
FIG. 13 is a sequence diagram of a procedure of processing in the first modification.

FIG. 13 is a sequence diagram of a procedure of processing in the first modification. The transmission system 10 according to the first embodiment executes processing in accordance with the sequence illustrated in FIG. 13 during a conference.

First, the information processing unit 61 of the first information processing apparatus 20 gives the attribute information indicating the attribute of the material data displayed on the transmission side display unit 63 to the input transmitter 62 of the first information processing apparatus 20 (S61). The information processing unit 61 gives the attribute information to the input transmitter 62 at the time of starting startup of the material data, as an example. The information processing unit 61 may give the attribute information to the input transmitter 62 when a periodic or certain event occurs, as an example.

The second information processing apparatus 30 generates the response data containing the attribute information indicating the attribute of the material data displayed on the reception side display unit 83. The second information processing apparatus 30 transmits the response data containing the attribute information to the relay apparatus 42 (S62). Next, the relay apparatus 42 transmits the response data containing the attribute information to the input transmitter 62 (S63).

Next, the input transmitter 62 determines whether the attribute of the material data displayed on the transmission side display unit 63 and the attribute of the material data displayed on the reception side display unit 83 match based on the attribute information given from the information processing unit 61 and the attribute information contained in the response data (S64).

The transmission side user performs an operation of some kind on the material data (S71). When the operation is performed by the transmission side user, the information processing unit 61 changes the display state of the material data to change the screen (S72). Next, the information processing unit 61 gives the operation information indicating the operation by the transmission side user to the input transmitter 62 of the first information processing apparatus 20 (S73).

Next, if determining that the attribute of the material data displayed on the transmission side display unit 63 and the attribute of the material data displayed on the reception side display unit 83 match, the input transmitter 62 incorporates the received operation information into the control data and transmits the control data to the relay apparatus 42 on the network (S74). In contrast, if determining that they do not match, the input transmitter 62 does not transmit the control data into which the operation information is incorporated.

Next, the relay apparatus 42 transmits the received control data to the second information processing apparatus 30 (S75). Next, the second information processing apparatus 30 changes the display state of the material data being displayed similarly to a case in which the operation indicated by the extracted operation information is performed to change the screen based on the operation information contained in the control data received from the relay apparatus 42 (S76).

As described above, the transmission system 10 according to the present modification can change the display state of the material data displayed on the reception side display unit 83 by the operation by the transmission side user when the same data is displayed on the transmission side display unit 63 and the reception side display unit 83. With this processing, the transmission system 10 according to the present modification can prevent the information displayed on the reception side display unit 83 from being changed by the operation by the transmission side user when different pieces of information are displayed on the transmission side display unit 63 and the reception side display unit 83.

Figure 14:
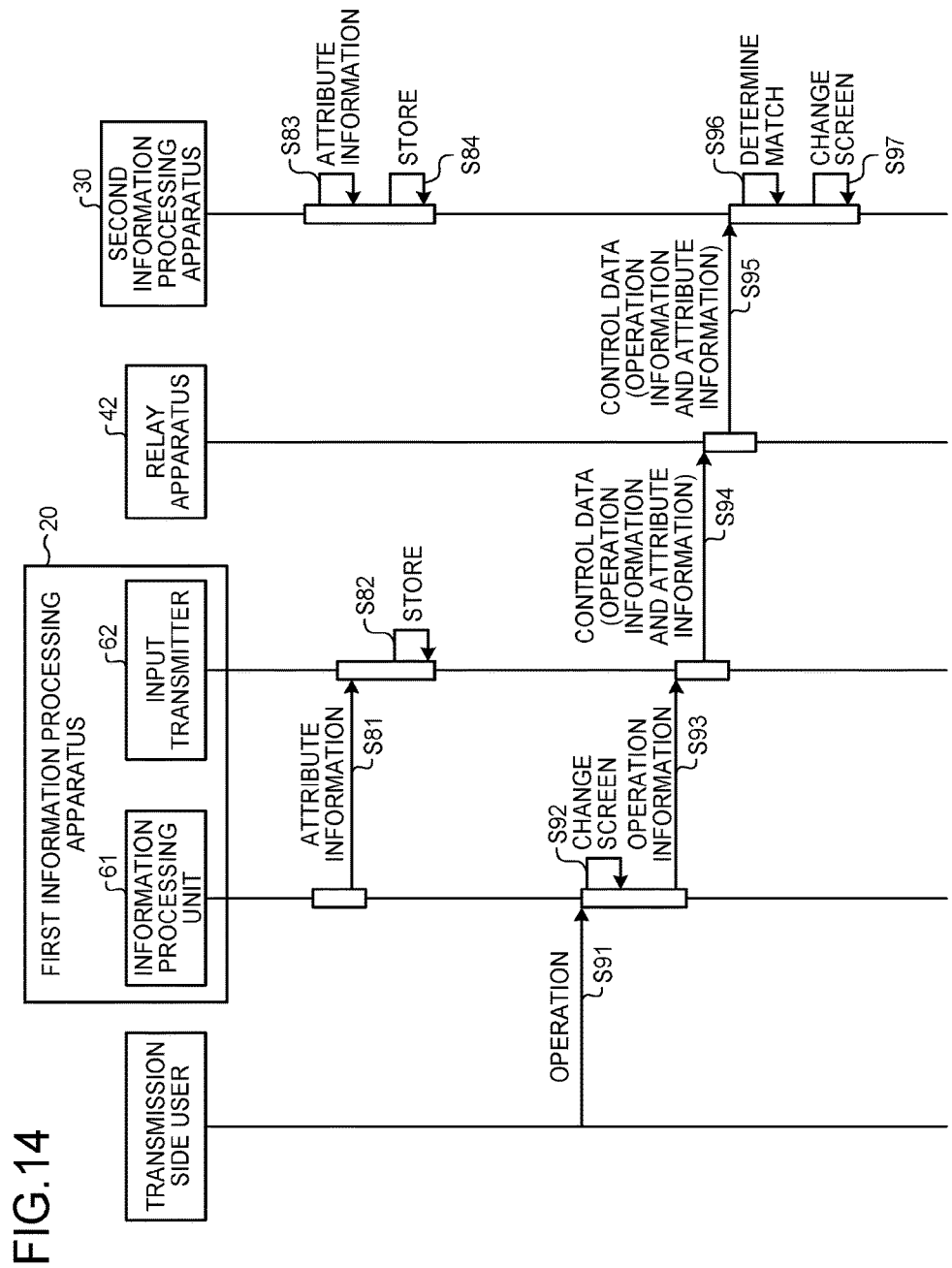
FIG. 14 is a sequence diagram of a procedure of processing in a second modification.

FIG. 14 is a sequence diagram of a procedure of processing in a second modification. In the transmission system 10 according to the second modification, the control data generating unit 73 of the first information processing apparatus 20 incorporates the attribute information into the control data and transmits the control data to the second information processing apparatus 30. If the attribute information of the material data displayed on the reception side display unit 83 and the attribute information of the material data displayed on the transmission side display unit 63 match, the reception side controller 93 of the second information processing apparatus 30 changes the display state of the material data in accordance with the operation information contained in the control data.

Specifically, the transmission system 10 according to the present modification executes processing in accordance with the sequence illustrated in FIG. 14 during a conference. First, the information processing unit 61 of the first information processing apparatus 20 gives the attribute information indicating the attribute of the material data displayed on the transmission side display unit 63 to the input transmitter 62 of the first information processing apparatus 20 (S81). Next, the input transmitter 62 stores therein the received attribute information (S82).

The second information processing apparatus 30 also acquires the attribute information indicating the attribute of the material data displayed on the reception side display unit 83 (S83). Next, the second information processing apparatus 30 stores therein the received attribute information (S84).

The transmission side user performs an operation of some kind on the material data (S91). When the operation is performed by the transmission side user, the information processing unit 61 changes the display state of the material data to change the screen (S92). Next, the information processing unit 61 gives the operation information indicating the operation by the transmission side user to the input transmitter 62 of the first information processing apparatus 20 (S93).

Next, the input transmitter 62 incorporates the received operation information and the attribute information indicating the attribute of the material data displayed on the transmission side display unit 63 into the control data and transmits the control data to the relay apparatus 42 on the network (S94). Next, the relay apparatus 42 transmits the received control data to the second information processing apparatus 30 (S95).

Next, the second information processing apparatus 30 determines whether the attribute information contained in the control data received from the relay apparatus 42 and the attribute information indicating the attribute of the material data displayed on the reception side display unit 83 match (S96).

Next, if determining that the attribute information contained in the control data received from the relay apparatus 42 and the attribute information of the material data displayed on the reception side display unit 83 match, the second information processing apparatus 30 changes the displays state of the material data being displayed similarly to a case in which the operation indicated by the operation information is performed to change the screen (S97). In contrast, if determining that they do not match, the second information processing apparatus 30 does not change the screen.

As described above, the transmission system 10 according to the present modification can change the screen of the material data displayed on the reception side display unit 83 by the operation by the transmission side user when the same data is displayed on the transmission side display unit 63 and the reception side display unit 83. With this processing, the transmission system 10 according to the present modification can prevent the information displayed on the reception side display unit 83 from being changed by the operation by the transmission side user when different pieces of information are displayed on the transmission side display unit 63 and the reception side display unit 83.

Figure 15:
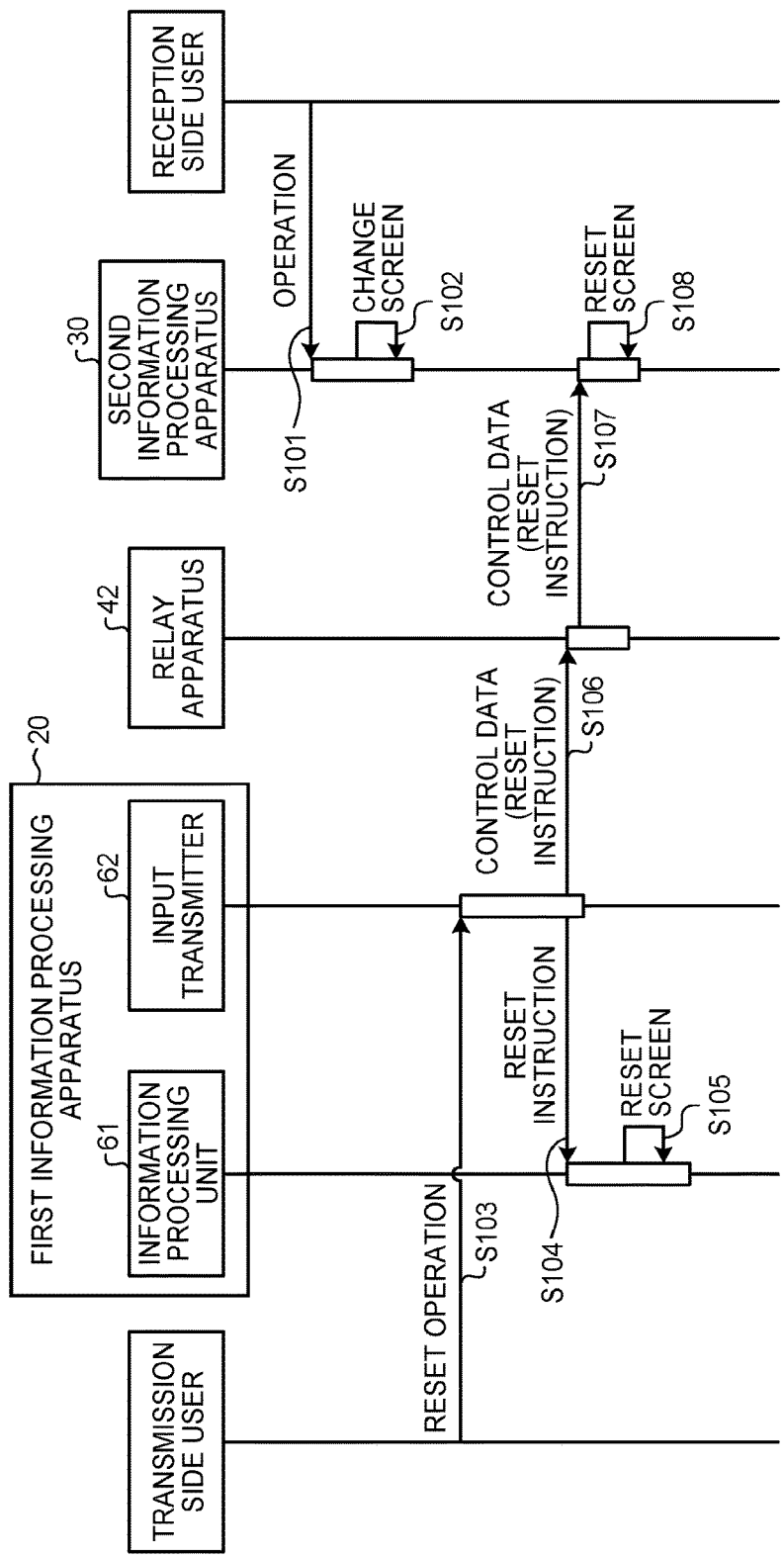
FIG. 15 is a sequence diagram of a procedure of processing in a third modification.

FIG. 15 is a sequence diagram of a procedure of processing in a third modification. In the third modification, the reception side controller 93 of the second information processing apparatus 30 changes the display state of the downloaded material data in accordance with the operation by the reception side user. With this processing, in the present modification, the reception side user can make the display state of the material data displayed on the reception side display unit 83 a state different from the display state of the material data displayed on the transmission side display unit 63.

In the present modification, the control data generating unit 73 of the first information processing apparatus 20 incorporates a reset instruction that resets the display state of the material data to be a preset display state into the control data in accordance with the operation by the transmission side user. The preset display state is a state that displays the first page of the material data, for example.

When receiving the control data containing the reset instruction, the control data processing unit 88 of the second information processing apparatus 30 gives the reset instruction contained in the control data to the reception side controller 93. When the reset instruction is given, the reception side controller 93 resets the display state of the material data to be the preset display state.

Specifically, the transmission system 10 according to the present modification executes processing in accordance with the sequence illustrated in FIG. 15 during a conference. First, the reception side user performs an operation of some kind on the material data (S101). When the operation is performed by the reception side user, the second information processing apparatus 30 changes the display state of the material data to change the screen (S102). With this processing, the reception side user can change the material data to any display state.

When desiring to synchronize the display state of the material data of the reception side display unit 83 with the display state of the material data of the transmission side display unit 63, the transmission side user performs a reset operation on the input transmitter 62 (S103). When the reset operation is performed, the input transmitter 62 gives the reset instruction to the information processing unit 61 (S104). When receiving the reset instruction, the information processing unit 61 resets the display state of the material data on the transmission side display unit 63 to be the preset display state (S105).

When the reset operation is performed, the input transmitter 62 transmits the control data containing the reset instruction to the relay apparatus 42 (S106). Next, the relay apparatus 42 transmits the control data containing the reset instruction to the second information processing apparatus 30 (S107). When receiving the control data containing the reset instruction, the second information processing apparatus 30 resets the display state of the material data on the reception side display unit 83 to be the preset display state (S108).

As described above, even when the display state of the material data displayed on the reception side display unit 83 and the display state of the material data displayed on the transmission side display unit 63 are different from each other, the transmission system 10 according to the present modification can match the display states with the preset display state in accordance with the operation by the transmission side user.

Figure 16:
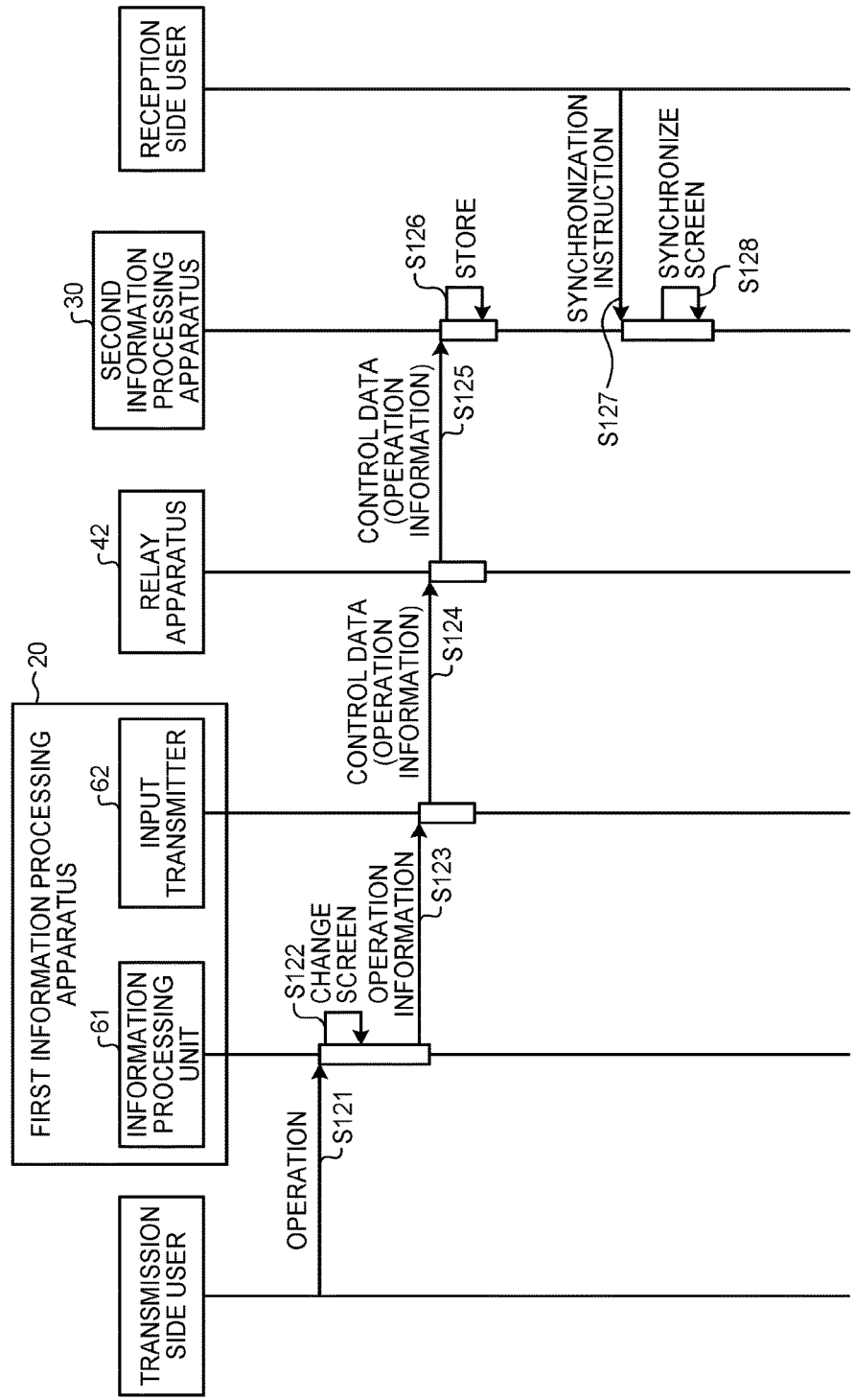
FIG. 16 is a sequence diagram of a procedure of processing in a fourth modification.

FIG. 16 is a sequence diagram of a procedure of processing in a fourth modification. In the present modification, the reception side storage unit 92 of the second information processing apparatus 30 stores therein the operation information contained in the control data transmitted from the first information processing apparatus 20. When receiving a synchronization instruction from the reception side user, the reception side controller 93 of the second information processing apparatus 30 changes the state of the material data displayed on the reception side display unit 83 to the state of the material data displayed on the transmission side display unit 63 at the present time based on the operation information stored in the reception side storage unit 92.

The control data generating unit 73 of the first information processing apparatus 20 may incorporate the synchronization instruction into the control data when a periodic or certain event occurs. When receiving the synchronization instruction from the first information processing apparatus 20, the reception side controller 93 of the second information processing apparatus 30 changes the display state of the material data displayed on the reception side display unit 83 to the display state of the material data displayed on the transmission side display unit 63 at the present time based on the operation information stored in the reception side storage unit 92.

Specifically, the transmission system 10 according to the present modification executes processing in accordance with the sequence illustrated in FIG. 16 during a conference. First, the transmission side user performs an operation of some kind on the material data (S121). When the operation is performed by the transmission side user, the information processing unit 61 changes the display state of the material data to change the screen (S122). Next, the information processing unit 61 gives the operation information indicating the operation by the transmission side user to the input transmitter 62 of the first information processing apparatus 20 (S123).

Next, the input transmitter 62 incorporates the received operation information into the control data and transmits the control data to the relay apparatus 42 on the network (S124). Next, the relay apparatus 42 transmits the received control data to the second information processing apparatus 30 (S125). Next, the second information processing apparatus 30 extracts the operation information contained in the control data received from the relay apparatus 42 and stores therein the operation information (S126).

The reception side user gives the synchronization instruction to the second information processing apparatus (S127). When the synchronization instruction is given from the reception side user, the second information processing apparatus 30 changes the state of the material data displayed on the reception side display unit 83 to the state of the material data displayed on the transmission side display unit 63 at the present time based on the stored operation information (S128).

The transmission side user may perform a synchronization operation on the input transmitter 62. When the synchronization operation is performed by the transmission side user, the input transmitter 62 transmits the control data containing a synchronization instruction to the second information processing apparatus 30 via the relay apparatus 42. When receiving the control data containing the synchronization instruction, the second information processing apparatus 30 changes the state of the material data displayed on the reception side display unit 83 to the state of the material data displayed on the transmission side display unit 63 at the present time based on the stored operation information.

As described above, even when the display state of the material data displayed on the reception side display unit 83 and the display state of the material data displayed on the transmission side display unit 63 are different states, the transmission system 10 according to the present modification can match the display state of the reception side display unit 83 with the present display state of the transmission side display unit 63 by the synchronization operation by the reception side user or the transmission side user.

An embodiment provides an advantageous effect that reference to material data is enabled in advance or more surely.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. A transmission system comprising:
a first information processing apparatus; and
a second information processing apparatus, wherein
the first information processing apparatus comprises circuitry configured to
before starting communication with the second information processing apparatus, upload material data to a third information processing apparatus;
acquire an operation by a user and output operation information indicating the acquired operation;
cause a transmission side display to display the material data and change how the material data is displayed in accordance with the operation by the user;
acquire attribute information of the material data displayed by the transmission side display; and
transmit control data including the operation information and the attribute information to the second information processing apparatus, and
the second information processing apparatus comprises circuitry configured to before starting communication with the first information processing apparatus, download the material data from the third information processing apparatus; and after starting communication with the first information processing apparatus; cause a reception side display to display the downloaded material data, in response to receiving the control data including the operation information and the attribute information, determine whether attribute information of the material data displayed by the reception side display matches the attribute information transmitted from the first information processing apparatus in the control data, and in response to a determination that the attribute information of the material data displayed by the reception side display matches the attribute information transmitted from the first information processing apparatus in the control data, change how the material data is displayed by the reception side display in accordance with the operation information included in the received control data.

2. The transmission system according to claim 1, wherein the first information processing apparatus is operated by a transmission side user, and
the second information processing apparatus is operated by a reception side user.

3. The transmission system according to claim 1, wherein the circuitry of the first information processing apparatus is further configured to
generate the control data containing the operation information; and
transmit the control data to the second information processing apparatus via a network, and
the circuitry of the second information processing apparatus is further configured to
receive the control data from the first information processing apparatus via the network; and
display the operation information contained in the control data on the reception side display.

4. The transmission system according to claim 3, wherein the circuitry of the first information processing apparatus is further configured to acquire a voice and output voice data indicating the acquired voice,
the circuitry of the first information processing apparatus further transmits the voice data to the second information processing apparatus via the network,
the circuitry of the second information processing apparatus further receives the voice data from the first information processing apparatus via the network, and
the second information processing apparatus further comprises a voice output speaker that reproduces the received voice data to output the voice.

5. The transmission system according to claim 3, wherein the circuitry of the first information processing apparatus is further configured to acquire an image and output image data indicating the acquired image,
the circuitry of the first information processing apparatus further transmits the image data to the second information processing apparatus via the network, and
the circuitry of the second information processing apparatus further receives the image data from the first information processing apparatus via the network, and
the second information processing apparatus further comprises an image output display that reproduces the received image data to output the image.

6. The transmission system according to claim 3, wherein the circuitry of the second information processing apparatus changes how the downloaded material data is displayed in accordance with an operation by the user.

7. The transmission system according to claim 6, wherein the circuitry of the first information processing apparatus incorporates a reset instruction to reset how the material data is displayed so that the material data is displayed in a preset manner, into the control data,
the circuitry of the second information processing apparatus resets how the material data is displayed so that the material data is displayed in the preset manner when the reset instruction is given.

8. The transmission system according to claim 3, wherein the circuitry of the first information processing apparatus incorporates an end instruction into the control data when communication with the second information processing apparatus is ended,
the circuitry of the second information processing apparatus deletes the downloaded material data when the end instruction is given.

9. The transmission system according to claim 8, wherein the circuitry of the first information processing apparatus incorporates reference permission information into the control data when the material data is made referable even after the communication is ended,
the circuitry of the second information processing apparatus does not execute deletion of the downloaded material data when the reference permission information is given.

10. The transmission system according to claim 3, wherein
the second information processing apparatus further comprises a reception side storage that stores therein the operation information contained in the control data transmitted from the first information processing apparatus, and
the circuitry of the second information processing apparatus changes how the material data is displayed on the reception side display such that the material data is displayed on the reception side display in the same manner as how the material data is displayed on the transmission side display at the present time based on the operation information stored in the reception side storage when a synchronization instruction is received from the user.

11. The transmission system according to claim 3, wherein
the second information processing apparatus further comprises a reception side storage that stores therein the operation information contained in the control data transmitted from the first information processing apparatus,
the circuitry of the first information processing apparatus incorporates a synchronization instruction into the control data when a periodic or certain event occurs, and
the circuitry of the second information processing apparatus changes how the material data is displayed on the reception side display such that the material data is displayed on the reception side display in the same manner as how the material data is displayed on the transmission side display at the present time based on the operation information stored in the reception side storage when the synchronization instruction is received from the first information processing apparatus.

12. A method of information processing in a transmission system that comprises a first information processing apparatus and a second information processing apparatus and transmits information provided from a user of the first information processing apparatus to a user of the second information processing apparatus via a network, the method comprising:

before starting communication with the second information processing apparatus, uploading, by the first information processing apparatus, material data to a third information processing apparatus;

causing, by the first information processing apparatus, a transmission side display to display the material data and changing, by the first information processing apparatus, how the material data is displayed in accordance with an operation by the user;

acquiring, by the first information processing apparatus, the operation by the user on the material data displayed on the transmission side display and outputting, by the first information processing apparatus, operation information indicating the acquired operation;

acquiring attribute information of the material data displayed by the transmission side display;

transmitting control data including the operation information and the attribute information to the second information processing apparatus;

before starting communication with the first information processing apparatus, downloading, by the second information processing apparatus, the material data from the third information processing apparatus;

opening, by the second information processing apparatus, the downloaded material data to cause a reception side display to display the material data;

in response to receiving the control data including the operation information and the attribute information in the second information processing apparatus, determining, by the second information processing apparatus, whether attribute information of the material data displayed by the reception side display matches the attribute information transmitted from the first information processing apparatus in the control data; and in response to a determination that the attribute information of the material data displayed by the reception side display matches the attribute information transmitted from the first information processing apparatus in the control data, changing, by the second information processing apparatus, how the material data is displayed by the reception side display in accordance with the operation information included in the received control data.

13. A non-transitory computer-readable storage medium storing computer-readable instructions thereon which, when executed by a transmission system that comprises a first information processing apparatus and a second information processing apparatus and transmits information provided from a user of the first information processing apparatus to a user of the second information processing apparatus via a network, causes the transmission system to perform a method comprising:

before starting communication with the second information processing apparatus, uploading, by the first information processing apparatus, material data to a third information processing apparatus;

causing, by the first information processing apparatus, a transmission side display to display the material data and changing, by the first information processing apparatus, how the material data is displayed in accordance with an operation by the user;

acquiring, by the first information processing apparatus, the operation by the user on the material data displayed on the transmission side display and outputting, by the first information processing apparatus, operation information indicating the acquired operation;

acquiring attribute information of the material data displayed by the transmission side display;

transmitting control data including the operation information and the attribute information to the second information processing apparatus;

before starting communication with the first information processing apparatus, downloading, by the second information processing apparatus, the material data from the third information processing apparatus;

opening, by the second information processing apparatus, the downloaded material data to cause a reception side display to display the material data;

in response to receiving the control data including the operation information and the attribute information in the second information processing apparatus, determining, by the second information processing apparatus, whether attribute information of the material data displayed by the reception side display matches the attribute information transmitted from the first information processing apparatus in the control data; and in response to a determination that the attribute information of the material data displayed by the reception side display matches the attribute information transmitted from the first information processing apparatus in the control data, changing, v the second information processing apparatus, how the material data is displayed by the reception side display in accordance with the operation information included in the received control data.

14. The transmission system according to claim 1, wherein the attribute information includes at least one of a file name, an update date, and a hash value of the material data.

15. The transmission system according to claim 1, wherein the circuitry of the second information processing apparatus is further configured to, in response to a determination that the attribute information of the material data displayed by the reception side display does not match the attribute information transmitted from the first information processing apparatus in the control data, maintain without change how the material data is displayed by the reception side display.

16. The method according to claim 12, further comprising, in response to a determination that the attribute information of the material data displayed by the reception side display does not match the attribute information transmitted from the first information processing apparatus in the control data, maintaining without change how the material data is displayed by the reception side display.

17. The non-transitory computer-readable storage medium according to claim 13, further comprising, in response to a determination that the attribute information of the material data displayed by the reception side display does not match the attribute information transmitted from the first information processing apparatus in the control data, maintaining without change how the material data is displayed by the reception side display.

* * * * *